US011843466B2

(12) United States Patent
Elshafie et al.

(10) Patent No.: US 11,843,466 B2
(45) Date of Patent: Dec. 12, 2023

(54) TURBO-HARQ UPLINK CONTROL INFORMATION FEEDBACK COMPRESSION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/338,592

(22) Filed: Jun. 3, 2021

(65) Prior Publication Data

US 2021/0385030 A1 Dec. 9, 2021

Related U.S. Application Data

(60) Provisional application No. 63/035,591, filed on Jun. 5, 2020.

(51) Int. Cl.
*H04B 7/04* (2017.01)
*H04L 1/1867* (2023.01)
(Continued)

(52) U.S. Cl.
CPC .......... *H04L 1/1896* (2013.01); *H04L 1/0003* (2013.01); *H04L 5/001* (2013.01);
(Continued)

(58) Field of Classification Search
None
See application file for complete search history.

(56) References Cited

U.S. PATENT DOCUMENTS 8,817,647 B2 * 8/2014 Liao .................. H04L 5/0057
370/252
9,106,419 B2 * 8/2015 Chen .................. H04B 7/0417
(Continued)

OTHER PUBLICATIONS

Fujitsu: "Discussion on HARQ-ACK Codebook and HARQ Feedback Timing", 3GPP Draft, 3GPP TSG RAN WG1 Meeting #91, R1-1719614, Discussion on HARQ-ACK Codebook and HARQ Feedback Timing Final, 3rd Generation Partnership Project (3GPP), Mobile Competence Centre, 650, Route Des Lucioles, F-06921 Sophia-Ant, vol. RAN WG1, No. Reno, USA, Nov. 27, 2017-Dec. 1, 2017, Nov. 17, 2017 (Nov. 17, 2017), XP051368827, 5 Pages, Retrieved from the Internet: URL: http://www.3gpp.org/ftp/tsg%5Fran/WG1%5FRL1/TSGR1%5F91/Docs/. [Retrieved on Nov. 17, 2017] pp. 1-3.

(Continued)

*Primary Examiner* — Sithu Ko
(74) *Attorney, Agent, or Firm* — Holland & Hart LLP

(57) ABSTRACT

Methods, systems, and devices for wireless communications are described. An example method of wireless communication at a user equipment includes receiving a data transmission for each of a plurality of component carriers (CCs) over a wireless channel from a base station, wherein each data transmission is associated with a number of code block groups (CBGs). The method further includes identifying a feedback protocol to apply to the plurality of CCs and selecting a subset of the plurality of CCs for which to report feedback information for the CBGs based at least in part on the feedback protocol. The method may also include generating the feedback information based at least in part on the subset of the plurality of CCs and the feedback protocol and transmitting a feedback message that indicates the feedback information for the subset of the plurality of CCs of the wireless channel to the base station.

25 Claims, 15 Drawing Sheets

(51) Int. Cl.
  *H04L 5/00* (2006.01)
  *H04W 72/0453* (2023.01)
  *H04L 1/00* (2006.01)
  *H04W 80/02* (2009.01)
  *H04W 72/23* (2023.01)

(52) U.S. Cl.
  CPC ....... *H04W 72/0453* (2013.01); *H04W 72/23* (2023.01); *H04W 80/02* (2013.01)

(56) References Cited

U.S. PATENT DOCUMENTS

| | | | | |
|---|---|---|---|---|
| 10,342,005 | B2 * | 7/2019 | Song | H04L 5/0094 |
| 10,404,438 | B2 * | 9/2019 | Park | H04B 7/0413 |
| 10,511,427 | B2 * | 12/2019 | Gaal | H04W 72/0453 |
| 10,574,404 | B2 * | 2/2020 | Kim | H04L 1/0067 |
| 11,394,494 | B2 * | 7/2022 | Kini | H04L 5/0055 |
| 2018/0006791 | A1 * | 1/2018 | Marinier | H04L 1/0073 |
| 2018/0302128 | A1 * | 10/2018 | Akkarakaran | H04B 7/0421 |
| 2019/0150181 | A1 | 5/2019 | Kim et al. | |
| 2019/0158250 | A1 | 5/2019 | Ang et al. | |
| 2020/0374040 | A1 * | 11/2020 | Lou | H04L 1/1614 |
| 2021/0051649 | A1 * | 2/2021 | He | H04W 72/0413 |

OTHER PUBLICATIONS

International Search Report and Written Opinion—PCT/US2021/036013—ISA/EPO—dated Sep. 24, 2021.
Wilus Inc: "Discussion on HARQ-ACK Multiplexing and Bundling for NR", 3GPP Draft, 3GPP TSG RAN WG1 Meeting 91, R1-1720876, Harq-Ack Multiplexing Final, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370274, 6 Pages, Retrieved from the Internet: URL: http://www.3gpp.org/ftp/tsg%5Fran/WG1%5FRL1/TSGR1%5F91/Docs/. [Retrieved on Nov. 18, 2017] pp. 2-3.

* cited by examiner

TURBO-HARQ UPLINK CONTROL INFORMATION FEEDBACK COMPRESSION

CROSS REFERENCE

The present application for patent claims the benefit of U.S. Provisional Patent Application No. 63/035,591 by ELSHAFIE et al., entitled "TURBO-HARQ UPLINK CONTROL INFORMATION FEEDBACK COMPRESSION," filed Jun. 5, 2020, assigned to the assignee hereof, and expressly incorporated by reference herein.

FIELD OF TECHNOLOGY

The following relates generally to wireless communications and more specifically to turbo hybrid automatic repeat request (HARQ) uplink control information (UCI) feedback compression.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink control information (UCI) compression in Turbo-HARQ. Generally, the described techniques provide for fixing a bit size of a feedback message in a Turbo-HARQ transmissions when multiple component carriers (CCs) are used. Each CC may have one or more code block groups (CBGs) in the transmitted data. When a data transmission occurs, some number of the CBGs of each CC may be successfully received and some may not. This number may change between transmissions. If feedback for every CC with a failed CBG is transmitted, the size of the transmission would vary between transmissions as the number of successfully received CBGs also varies between transmissions. This size variation can cause inefficiencies and delays. Techniques described herein provide a fixed size for the feedback transmission regardless of how many CBGs fail.

A method of wireless communication at a UE is described. The method may include receiving a data transmission for each of a set of CCs over a wireless channel from a base station, where each data transmission is associated with a number of CBGs. The method may further include identifying a feedback protocol to apply to the set of CCs and selecting a subset of the set of CCs for which to report feedback information for the CBGs based on the feedback protocol. The method may also include generating the feedback information based on the subset of the set of CCs and the feedback protocol and transmitting a feedback message that indicates the feedback information for the subset of the set of CCs of the wireless channel to the base station.

An apparatus for wireless communication at a UE is described. The apparatus may include a processor, memory coupled with the processor, and instructions stored in the memory. The instructions may be executable by the processor to cause the apparatus to receive a data transmission for each of a set of CCs over a wireless channel from a base station, where each data transmission is associated with a number of CBGs. The instructions may also be executable by the processor to cause the apparatus to identify a feedback protocol to apply to the set of CCs and select a subset of the set of CCs for which to report feedback information for the CBGs based on the feedback protocol. The instructions may also be executable by the processor to cause the apparatus to generate the feedback information based on the subset of the set of CCs and the feedback protocol and transmit a feedback message that indicates the feedback information for the subset of the set of CCs of the wireless channel to the base station.

Another apparatus for wireless communication at a UE is described. The apparatus may include means for receiving a data transmission for each of a set of CCs over a wireless channel from a base station, where each data transmission is associated with a number of CBGs. The apparatus may also include means for identifying a feedback protocol to apply to the set of CCs and means for selecting a subset of the set of CCs for which to report feedback information for the CBGs based on the feedback protocol. The apparatus may also include means for generating the feedback information based on the subset of the set of CCs and the feedback protocol and transmitting a feedback message that indicates the feedback information for the subset of the set of CCs of the wireless channel to the base station.

A non-transitory computer-readable medium storing code of wireless communication at a UE is described. The code may include instructions executable by a processor to receive a data transmission for each of a set of CCs over a wireless channel from a base station, where each data transmission is associated with a number of CBGs. The code may include instructions executable by the processor to identify a feedback protocol to apply to the set of CCs and select a subset of the set of CCs for which to report feedback information for the CBGs based on the feedback protocol. The code may also include instructions executable by the processor to generate the feedback information based on the subset of the set of CCs and the feedback protocol and transmit a feedback message that indicates the feedback information for the subset of the set of CCs of the wireless channel to the base station.

Some examples of the method, apparatuses, and non-transitory computer-readable medium described herein may further include operations, features, means, or instructions for determining a reception status for each CBG of each of the data transmissions for each of the set of CCs, where the feedback information may be based on the reception status.

Some examples of the method, apparatuses, and non-transitory computer-readable medium described herein may further include operations, features, means, or instructions for receiving an indication of the feedback protocol from the base station, where identifying the feedback protocol may be based on receiving the indication. In some examples, the indication of the feedback protocol may be included in one of a radio resource control (RRC) signal, a media access control (MAC) control element (CE), or a downlink control information (DCI) message.

In some examples of the method, apparatuses, and non-transitory computer-readable medium described herein, the feedback information includes one or more of a channel quality index (CQI), a modulation and coding scheme (MCS), or a downlink control information miss detection.

In some examples of the method, apparatuses, and non-transitory computer-readable medium described herein, identifying the feedback protocol further may include operations, features, means, or instructions for determining a maximum number of bits for the feedback information, where generating the feedback information may be based on the maximum number of bits.

In some examples of the method, apparatuses, and non-transitory computer-readable medium described herein, the feedback protocol defines an order of priority of the CCs. In such examples, selecting a subset of the set of CCs for which to report feedback information for the CBGs further may include operations, features, means, or instructions for determining a maximum size of the subset of the set of CCs, identifying the CCs that may have a failed CBG, and including the highest priority CCs with at least one failed CBG in the subset of the set of CCs up to the maximum size of the subset of the set of CCs, where generating the feedback information may be based on the inclusion.

In some examples of the method, apparatuses, and non-transitory computer-readable medium described herein, the order of priority of the CCs may be based on at least one of a CC index, a mapping of each CC to a priority level, a type of information included in the data transmission for each CC, a quality-of-service requirement for each CC, or a priority of the information included in the data transmission for each CC.

Some examples of the method, apparatuses, and non-transitory computer-readable medium described herein may further include operations, features, means, or instructions for determining a conflict between a first CC and a second CC having a same priority, and selecting one of first CC and the second CC based on an order of the CCs.

In some examples of the method, apparatuses, and non-transitory computer-readable medium described herein, the feedback protocol defines an order of the CCs, and where selecting a subset of the set of CCs for which to report feedback information for the CBGs further may include operations, features, means, or instructions for identifying the CCs that may have a failed CBG, and including those CCs with at least one failed CBG in the subset of the set of CCs based on the order, where generating the feedback information may be based on the inclusion.

In some examples of the method, apparatuses, and non-transitory computer-readable medium described herein, the feedback protocol defines a threshold number of failed CBGs, and where selecting a subset of the set of CCs for which to report feedback information for the CBGs further may include operations, features, means, or instructions for identifying those CCs that may have at least the threshold number of failed CBGs, and including the CCs that may have at least the threshold number of failed CBGs in the subset of the set of CCs, where generating the feedback information may be based on the inclusion.

In some examples of the method, apparatuses, and non-transitory computer-readable medium described herein, including the CCs that may have at least the threshold number of failed CBGs further may include operations, features, means, or instructions for prioritizing the CCs with the higher numbers of failed CBGs in the subset of the set of CCs.

In some examples of the method, apparatuses, and non-transitory computer-readable medium described herein, the threshold number of failed CBGs includes a ratio of the failed CBGs in each CC to a total number of CBGs in that CC. In some examples of the method, apparatuses, and non-transitory computer-readable medium described herein, the threshold number of failed CBGs includes a percentage of the failed CBGs in each CC.

In some examples of the method, apparatuses, and non-transitory computer-readable medium described herein, the feedback protocol defines a maximum number of CCs to be included in the subset of CCs, and where selecting a subset of the set of CCs for which to report feedback information for the CBGs may be based on the maximum number.

Some examples of the method, apparatuses, and non-transitory computer-readable medium described herein may further include operations, features, means, or instructions for encoding additional feedback information for two or more CCs into joint feedback information, where generating the feedback information may be further based on the joint feedback information. In some examples of the method, apparatuses, and non-transitory computer-readable medium described herein, the two or more CCs may be not included in the subset of CCs.

Some examples of the method, apparatuses, and non-transitory computer-readable medium described herein may further include operations, features, means, or instructions for determining that a size of the feedback information may be less than a total size for the feedback message, where encoding the additional feedback information may be based on the determination that the size of the feedback information may be less than the total size.

In some examples of the method, apparatuses, and non-transitory computer-readable medium described herein, encoding the additional feedback information further may include operations, features, means, or instructions for applying a coding table to the additional feedback information to encode the joint feedback information.

A method of wireless communication at a base station is described. The method may include identifying a feedback protocol to apply to a set of component carriers to determine feedback information, transmitting an indication of the feedback protocol to a user equipment (UE), transmitting a data transmission for each of the set of component carriers over a wireless channel to the UE, where each data transmission is associated with a number of code block groups, and receiving a feedback message that indicates feedback information for a subset of the set of component carriers of the wireless channel according to the feedback protocol from the UE.

An apparatus for wireless communication at a base station is described. The apparatus may include a processor, memory coupled with the processor, and instructions stored in the memory. The instructions may be executable by the processor to cause the apparatus to identify a feedback protocol to apply to a set of component carriers to determine feedback information, transmit an indication of the feedback protocol to a UE, transmit a data transmission for each of the set of component carriers over a wireless channel to the UE, where each data transmission is associated with a number of code block groups, and receive a feedback message that indicates feedback information for a subset of the set of component carriers of the wireless channel according to the feedback protocol from the UE.

Another apparatus for wireless communication at a base station is described. The apparatus may include means for identifying a feedback protocol to apply to a set of component carriers to determine feedback information, transmitting an indication of the feedback protocol to a UE, transmitting a data transmission for each of the set of component carriers over a wireless channel to the UE, where each data transmission is associated with a number of code block groups, and receiving a feedback message that indicates feedback information for a subset of the set of component carriers of the wireless channel according to the feedback protocol from the UE.

A non-transitory computer-readable medium storing code for wireless communication at a base station is described. The code may include instructions executable by a processor to identify a feedback protocol to apply to a set of component carriers to determine feedback information, transmit an indication of the feedback protocol to a UE, transmit a data transmission for each of the set of component carriers over a wireless channel to the UE, where each data transmission is associated with a number of code block groups, and receive a feedback message that indicates feedback information for a subset of the set of component carriers of the wireless channel according to the feedback protocol from the UE.

Some examples of the method, apparatuses, and non-transitory computer-readable medium described herein may further include operations, features, means, or instructions for determining a reception status for each code block group of each of the data transmissions for each of the subset of the set of component carriers based on the feedback information.

In some examples of the method, apparatuses, and non-transitory computer-readable medium described herein, the feedback information includes one or more of a channel quality index, a modulation and coding scheme, or a downlink control information miss detection.

In some examples of the method, apparatuses, and non-transitory computer-readable medium described herein, identifying the feedback protocol further may include operations, features, means, or instructions for determining a maximum number of bits for the feedback information, where identifying the feedback protocol may be based on the maximum number of bits.

In some examples of the method, apparatuses, and non-transitory computer-readable medium described herein, the feedback protocol defines an order of priority of the component carriers.

In some examples of the method, apparatuses, and non-transitory computer-readable medium described herein, the order of priority of the component carriers may be based on at least one of a component carrier index, a mapping of each component carrier to a priority level, a type of information included in the data transmission for each component carrier, a quality-of-service requirement for each component carrier, or a priority of the information included in the data transmission for each component carrier.

In some examples of the method, apparatuses, and non-transitory computer-readable medium described herein, the feedback protocol defines an order of the component carriers, a threshold number of failed code block groups, a maximum number of component carriers to be included in the subset of component carriers, and where selecting a subset of the set of component carriers for which to report feedback information for the code block groups may be based on the maximum number.

Some examples of the method, apparatuses, and non-transitory computer-readable medium described herein may further include operations, features, means, or instructions for decoding joint feedback information for two or more component carriers from the feedback information.

In some examples of the method, apparatuses, and non-transitory computer-readable medium described herein, the two or more component carriers may be not included in the subset of component carriers.

In some examples of the method, apparatuses, and non-transitory computer-readable medium described herein, encoding the additional feedback information further may include operations, features, means, or instructions for applying a coding table to the additional feedback information to encode the joint feedback information.

DETAILED DESCRIPTION

Figure 1:
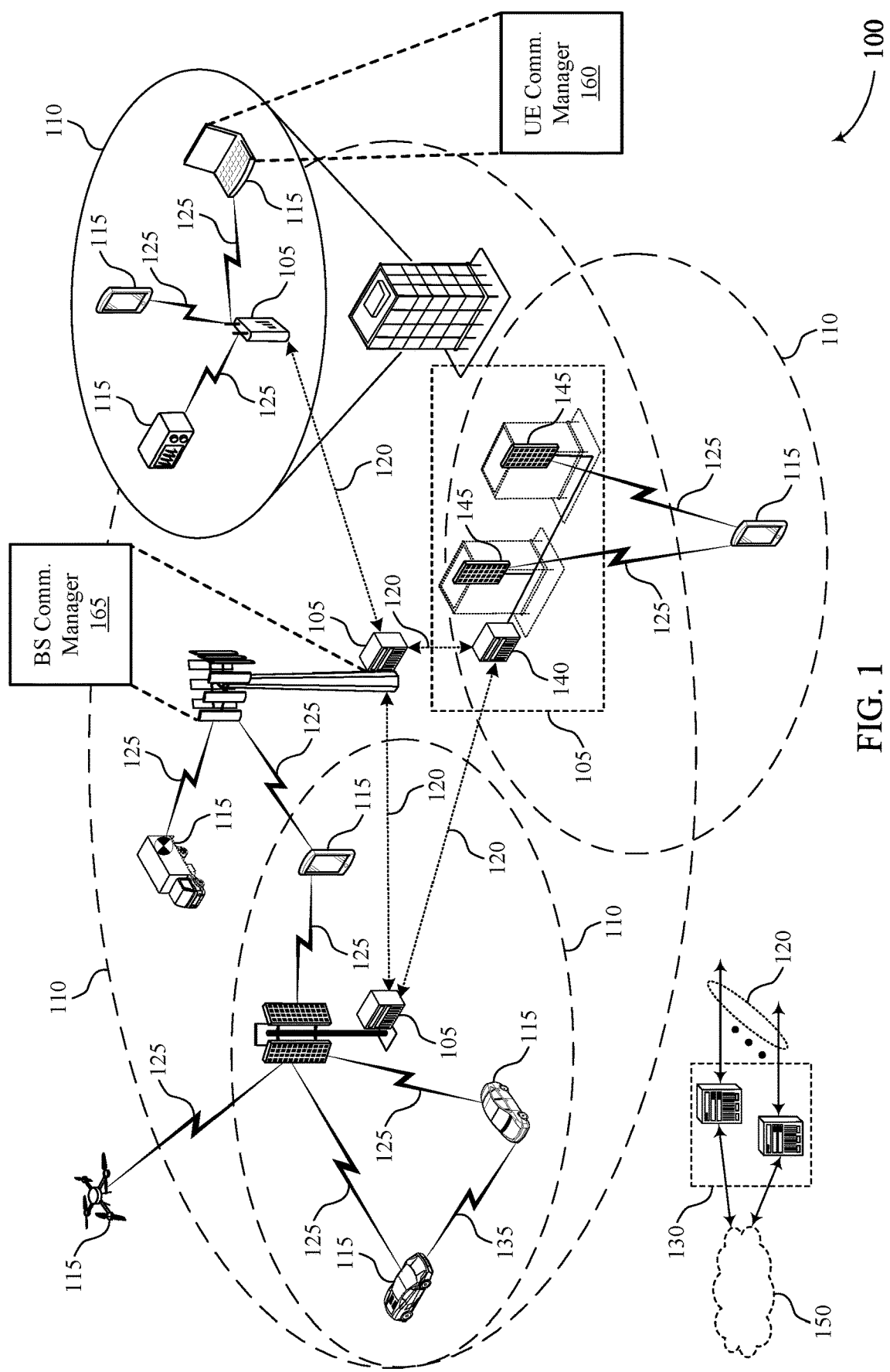
FIG. 1 illustrates an example of a system for wireless communications that supports turbo-HARQ UCI feedback compression in accordance with aspects of the present disclosure.

A wireless communications system may support Turbo-HARQ with ACK/NACK and channel state information (CSI) feedback. In Turbo-HARQ, the UE sends some feedback to the base station which helps the base station change some of the modulation parameters to reduce the error whenever there is a NACK. However, when multiple CCs are used and they each have multiple CBGs, the size of the Turbo-HARQ may vary. This is because different numbers of CBGs may have failed for different transmissions. This varying feedback information size can be inefficient and difficult to work with at the UE and gNB.

A fixed size for the feedback information (channel quality index (CQI), MCS, and downlink control information (DCI) miss detection (DTX)) may improve functionality of Turbo-HARQ. Several ways of obtaining the fixed size are described. The way the fixed size (e.g., a fixed bit size) is obtained may be determined and signaled between the UE and gNB. However, by having a fixed size, not all of the feedback information may be transmitted for each CC. Therefore, compression may be performed for the feedback message. The different compression solutions described herein provide ways to capture different numbers of CCs.

A first method is to drop or omit information from the feedback message. For example, an order for omissions protocol may be determined for the CCs that may be followed. For example, if a CBG of a first CC has a NACK, it may always be included, then a second CC, and so on. The order may be set by a CC index, and could prioritize high index to low index, or vice-versa. The higher CCs with NACKs get included until the fixed bit size is full, and the rest of the CCs are dropped. The UE and gNB should agree on the ordering and signal. The signal could be in RRC or MAC-CE and dynamically change through the DCI. This ordering could be used whenever a conflict occurred between two CCs.

The ordering and omission may be based on other criteria, such as how many NACKs a CC has, a ratio of NACKs to total CBGs, a percentage of NACKs of the total CBGs, a minimum number of NACKed CBGs a CC has, a priority of the CCs, a type of information sent on the CC, a maximum number of NACKS to report, and the like.

Another technique is to jointly encode some of the CC information and drop others. Following the CC selection by one of the above methods, the technique can then determine which additional CCs need uplink control information bundling. Those CCs can be jointly encoded into a number of leftover bits (e.g., 2 or 3 bits). A table known at the UE and gNB can be used to encode and decode the jointly encoded UCI.

The described techniques may lead to improved efficiency and communications, as well as improving configuration for MCS, reduce bit error rates, improve coding rates, decrease system latency, and improve user experience.

Aspects of the disclosure are initially described in the context of wireless communications systems. Aspects of the disclosure are further illustrated by and described with reference to a swim diagram, a block diagram, and a flowchart. Aspects of the disclosure are further illustrated by and described with reference to apparatus diagrams, system diagrams, and flowcharts that relate to turbo-HARQ UCI feedback compression.

FIG. 1 illustrates an example of a wireless communications system 100 that supports turbo-HARQ UCI feedback compression in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Media Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In RLC applications, data transmissions may need to be as quick as possible with the least number of retransmissions. In Turbo-HARQ, a UE provides feedback to the transmitting base station for the base station to change the modulation parameters, MCS, or the modulation order for a subsequent retransmission. Typically, a first transmission may have a block error rate (BLER) of 10%. Techniques described herein provide reduced BLERs, which results in improved reliability and latency. Techniques described herein may increase the likelihood that the second transmission of a data transmission will be successful.

In FIG. 1, a UE 115 includes a UE communications manager 160. The UE communications manager 160 may perform techniques described herein related to providing feedback in Turbo-HARQ. The UE communications manager 160 may determine which feedback protocol to use in order to have a fixed bit size of the Turbo-HARQ feedback. The fixed size of the Turbo-HARQ feedback may include CQI, MCS, or DTX for at least a subset of CCs for a data transmission. Based on the feedback, the base station 105 may change one or more modulation parameters in order to enhance the transmission layers or encode the BLER so that a retransmission should succeed with less error. The UE communications manager 160 may obtain a small BLER within two transmissions per transmit block and have a fixed Turbo-HARQ feedback size.

In some examples, the UE communications manager 160 may receive a data transmission for each of a plurality of CCs over a wireless channel from base station 105, wherein each data transmission is associated with a number of CBGs. The UE communications manager 160 may identify a feedback protocol to apply to the plurality of component carriers and select a subset of the plurality of component carriers for which to report feedback information for the code block groups based at least in part on the feedback protocol. The UE communications manager 160 may generate the feedback information based at least in part on the subset of the plurality of component carriers and the feedback protocol and transmit a feedback message that indicates the feedback information for the subset of the plurality of component carriers to the base station.

A base station 105 may include a base station communications manager 165. The base station communications manager 165 may perform techniques described herein related to receiving feedback in Turbo-HARQ. The base station communications manager 165 may determine a feedback protocol with or without negotiating with the UE 115. The base station communications manager 165 may receive feedback information from the UE 115 regarding a data transmission. The feedback information may include, for example, a negative acknowledgement (NACK), a CQI index, an MCS, a DTX, or a transmission rank. The base station communications manager 165 may update one or more transmission parameters, such as an MCS rate, based on the received feedback. Then the base station 105 may retransmit the data.

The described techniques may decrease system latency, improve configurations of MCS, reduce bit error rates, improve efficiencies, improve coding rates, and improve user experience. The described techniques may improve functioning for ultra-reliability communications. Further, the described techniques may improve the functioning of the physical layer in wireless communications.

Figure 2:
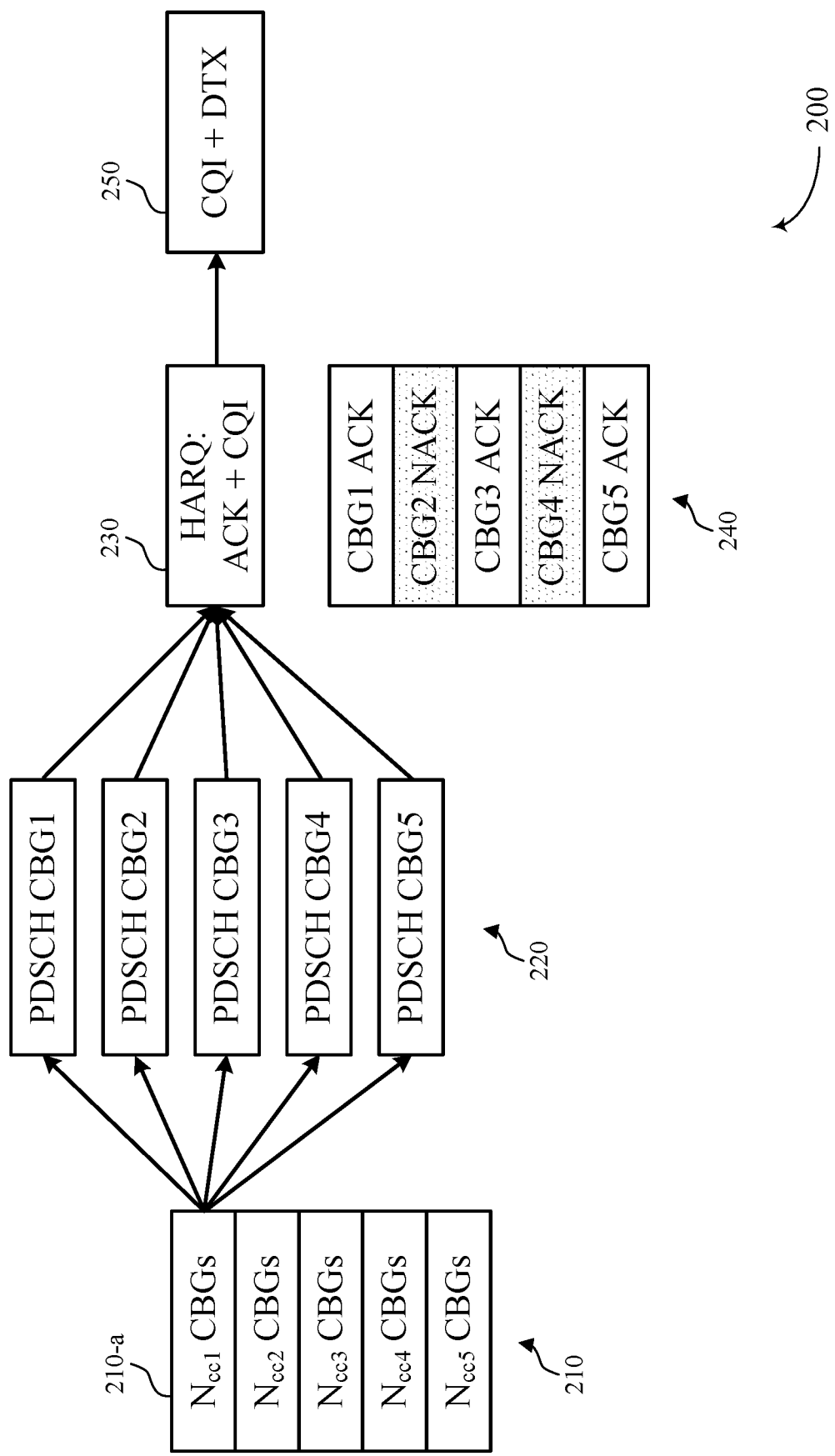
FIG. 2 illustrates an example of a block diagram of turbo-HARQ UCI in accordance with aspects of the present disclosure.

FIG. 2 illustrates an example of a block diagram 200 of turbo-HARQ UCI in accordance with aspects of the present disclosure. In some examples, the block diagram 200 may implement aspects of wireless communication system 100. Concepts shown in the block diagram 200 may be incorporated into a UE, such as a UE 115 as described herein. The block diagram 200 illustrates how a data transmission may use a number of CCs 210, which each have a number of CBGs, and the feedback for those CCs 210. For simplicity of illustration, the CBGs 220 for only a single CC 210 are shown, that of CC1 210-a.

Generally, each CC may have one or more CBGs. $N_{CC_k}$ may be defined as the number of CBGs per CC k. In this example, CC1 210-a has five CBGs 220 and $N_{CC_1}=1$. Two stages of feedback may be included. A first stage feedback 230 may include HARQ acknowledgement and CQI may be generated for each of the CBGs 220 and may be referred to as the first stage of the HARQ feedback. CBGs 240 are shown in FIG. 2, which corresponds to the status of the CBGs 220 for CC1 210-a. In this example, CBG1, CBG3, and CBG5 have been successfully decoded and their reception status is acknowledgment (ACK). However, two CBGs 240 failed to decode, including CBG2 and CBG4. The reception status for these CBGs 240 is negative acknowledgement (NACK). For these two CBGs 240, additional feedback can be sent in the Turbo-HARQ feedback. This additional feedback is second stage feedback 250 and may include CQI, MCS, and DTX information.

Because there were two NACKed CBGs 240 in this example, the second stage feedback 250 could be a size to fit information related to two NACKed CBGs. If, however, there were four NACKed CBGs 240, the second stage feedback 250 would have be a size to fit information related to four NACKed CBGs. Other examples would be analogous. That is, the more CBGs that are NACKed, the larger the second stage feedback 250 would have to be. The size may also vary between data transmissions as more or less CBGs fail. These changes in size of the feedback message may be problematic for the communication devices. Techniques described herein provide compression methods for maintaining the second stage feedback 250 at a fixed size.

The size of the first stage feedback 230 may be partially determined by a HARQ-ACK codebook size. If the codebook is type 1 (e.g., a semi-static codebook), the size of the first stage feedback 230 is configured by the radio resource control (RRC). Alternatively, if the codebook is type 2 (e.g., a dynamic codebook), the size of the first stage feedback 230 is indicated by a downlink assignment index (DAI) field in downlink (DL) downlink control information (DCI).

The size of the second stage feedback 250 may be determined as N·K, where N is the number of NACKs in the stage 1 codebook and K is an RRC, MAC-CE, or DCI configurable bit width for associated information with the NACKs. The size of the second stage feedback 250 may depend on the payload of the first stage feedback 230. The receiver of the feedback, such as a base station, may need to decode the first stage feedback 230 before it can determine the size of the second stage feedback 250. Techniques described herein enable the receiver of the feedback to determine the size of the second stage feedback 250 without needing to decode the first stage feedback 230.

Various solutions to the variable size for the total UCI size are proposed. To have a fixed size, RRC configuration may be used to provide an upper bound (B) for the total size of the first stage feedback 230 and the second stage feedback 250. Alternatively, only an upper bound (L) may be set for the second stage feedback 250. The first stage feedback 230 may always be transmitted and the second stage feedback 250 may be compressed if the size of the first stage feedback 230 plus the second stage feedback 250 is greater than B for the first option or the size of the second stage feedback 250 is greater than L for the second option.

Three general ways to perform compression are proposed. First, information in the second stage feedback 250 may be dropped or omitted. Second, information in the second stage feedback 250 may be bundled, combined, or joint encoded across multiple CCs. Third, some information in the second stage feedback 250 may be dropped for some CCs and jointly encoded for other CCs.

Figure 3:
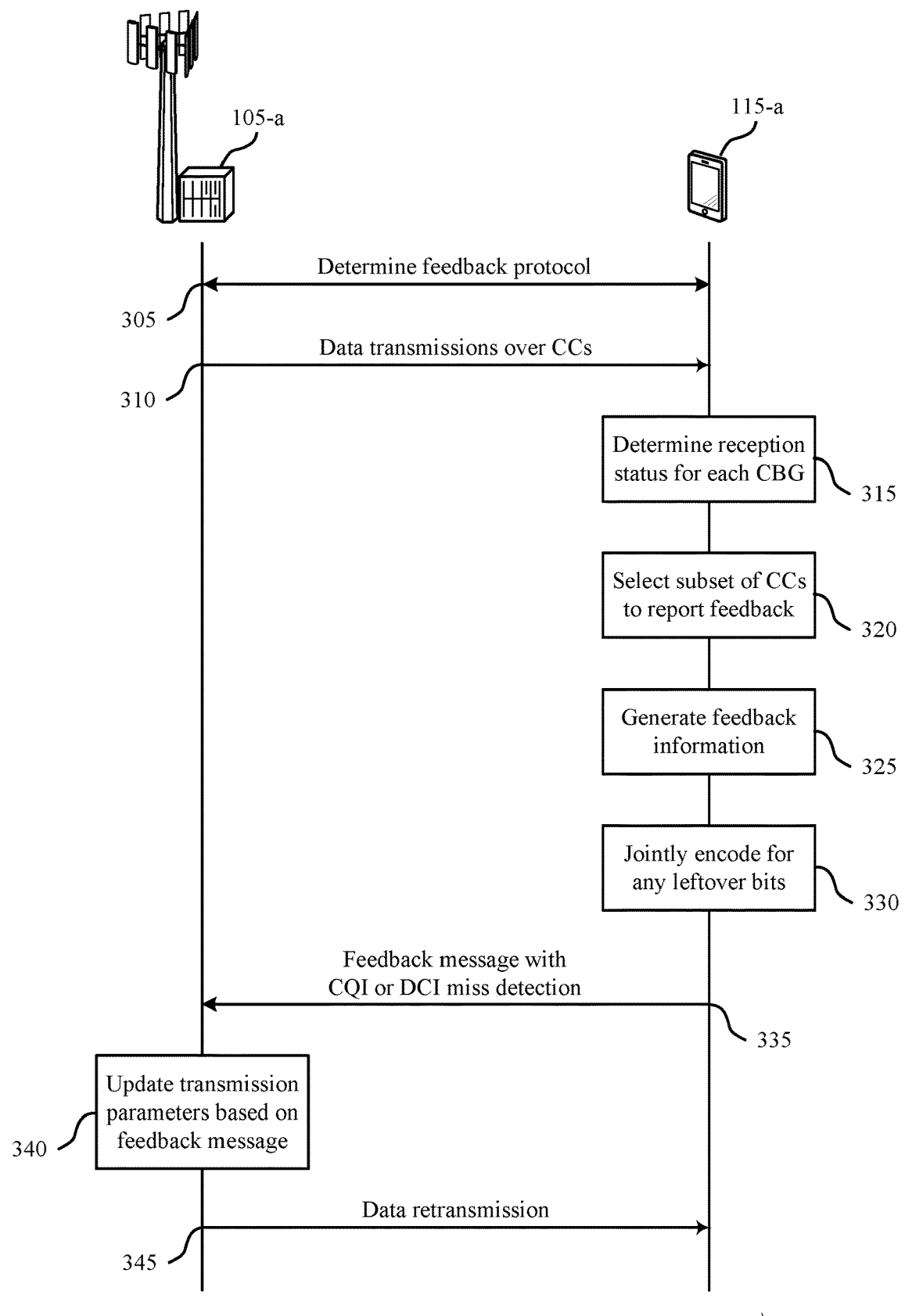
FIG. 3 shows a swim diagram of a wireless communication system illustrating example operations that support turbo-HARQ UCI feedback compression in accordance with aspects of the present disclosure.

FIG. 3 shows an example of a swim diagram of a wireless communication system 300 illustrating example operations that support turbo-HARQ UCI feedback compression in accordance with aspects of the present disclosure. The wireless communication system 300 may include a base station 105-*a* and a UE 115-*a*. In some examples, the wireless communication system 300 may implement aspects of wireless communication system 100, the base station 105-*a* may be an example of aspects of a base station 105, and the UE 115-*a* may be an example of aspects of a UE 115.

At 305, the base station 105-*a* and UE 115 may determine a feedback protocol. In some examples, the feedback protocol may be determined a priori by one of the base station 105-*a* or the UE 115, and the determining device signals the other device of which feedback protocol is used. In some examples, the feedback protocol is negotiated by the base station 105-*a* and the UE 115. In addition to the feedback protocol, an order of CCs may be determined which can be used to select the CCCs or to act as a tie breaker when two or more CCs are competing for the same part of the Turbo-HARQ feedback. Different feedback protocol options are discussed below.

In some examples, to reduce the amount of required feedback, the base station 105-*a* and UE 115 may use an ordering of omission protocol where the dropping or omission is performed based on a predefined order across CCs. Some alternatives may be used.

First, second stage feedback may omit or drop some feedback information based on an upper bounded size for the second stage feedback information. As an example that refers back to FIG. 2, assume the second stage feedback size has been bound to 3K bits and a predefined order of the CCs provides the highest priority to CC1, then CC2, CC3, CC4, and CC5 at the lowest priority. Because the second stage feedback size is limited to 3K, only three CCs may be selected to have their second stage feedback information included. Because of the priority order (and assuming all CCs 1 through 5 have NACKs), CC1-CC3 are selected to keep their second stage feedback information. Since CC1-CC3 would fill up the second stage feedback size, the second stage feedback information for CC4 and CC5 must be dropped.

Signaling for this type of solution may be provided as follows. The base station 105-*a* and UE 115 may agree on a general ordering for the CCs based on importance. For example, the priority ordering may start from the lowest CC index to the highest CC index. Alternatively, the priority ordering may start from the highest CC index to the lowest CC index. As another option, any ordering of the CCs and the priority levels may be mapped.

In some examples, the signaling of the ordering may be in a RRC or MAC-CE and could change dynamically through DCI. The ordering may be used wherever a conflict happens among the CCs using the feedback protocol.

In one example, a feedback protocol may be a blind omission that is based on the predefined ordering as described above. That is, those CCs with the highest priority could be included until the second stage feedback information is full, and the rest may be omitted. This example provides less computation but may be less efficient overall for improving performance.

Another example of a feedback protocol may be based on the number of failed CRC CBGs. This type of feedback protocol may be determined in a number of ways. For example, the CCs with the higher number of NACKed CBGs may be given higher priority over the CCs with the lower number of NACKed CBGs. This may result in better transmission parameters for a particularly unclear channel. As a second example, the feedback protocol may be modified such that the number of NACKed CBGs over a total number of CBGs for each CC may be used to select the subset of CCs. As a third example, the feedback protocol may be based on a percentage or threshold amount of the number of NACKed CBGs over the total number of CBGs for each CC. Any of these alternative feedback protocols may be signaled over RRC, MAC-CE, or DCI.

Using one of the feedback protocols based on the number of failed CRC CBGs may result in a conflict (e.g., two or more CCs qualifying for inclusion based on having the same priority, but there is insufficient space for all of them). For example, if two or more CCs have the same number of NACKed CBGs, those CCs may be given the same priority level. That is, they may be grouped with the same level of priority. In such a case, the predetermined ordering may be used.

As an example, consider using the feedback protocol that the higher number of failed CRC CBGs gets priority with an example of 3 CCs. If CC1 has 4 NACKed CBGs, CC2 has 2 NACKed CBGs, and CC3 has 2 NACKed CBGs, CC1 will be given the highest priority level, Level 1, while CC2 and CC3 will be given the second priority level, Level 2 in this example. If the UE 115-*a* needs to omit some CQI, MCS, or DTX feedback, the UE 115-*a* could omit either CC2 or CC3 CQIs. If only one CC needs to be omitted, the UE 115-*a* may use the agreed ordering, then discard CC3 if CC2 was given the higher priority order.

Another feedback protocol may be based on a minimum number of NACKed CBGs per CC required to report CQI for that CC. The base station 105-*a* may configure an RRC, MAC-CE, or DCI parameter to inform the UE 115-*a* that this is the feedback protocol and what the minimum number of NACKed CBGs per CC is. That is, the base station 105-*a* and the UE 115-*a* may agree that the UE 115-*a* may report a CC CQI only if the number of NACKed CBGs is above that minimum number. For example, if the minimum number is three, the UE 115-*a* may send the second stage feedback only when a CC has more than three NACKs. If a CC has less than or equal to 3 NACKs, the UE 115-*a* may only report DTX using 1 bit or may even omit DTX. Whether the CCs that do not meet the requirement will be dropped or signaled using 1 bit may also be signaled beforehand. Afterwards, among the remaining CCs, the UE 115-*a* may assign bits to the highest priority CCs until satisfying a certain number of required bits for the first stage UCI and the second stage UCI or to the second stage UCI only.

An alternative feedback protocol may be based on the maximum number of CCs needing NACKs to report their DTX/CQI or DTX only. After determining the priority order as discussed above, the UE 115-*a* may report only a subset of those CCs second stage feedback. This could be a UE capability (because UE might be unable to compute CQI for all CCs due to a lack of capability). Alternatively, only CQI or MCS may be reported in the feedback.

All of these feedback protocols may be used to reduce the number of CCs needed to be reported. In other examples, other feedback protocols may be used. Additionally, joint encoding for the second stage feedback information may be used, as discussed below.

Returning to FIG. 3, at 310 the base station 105-a may transmit a data transmission to the UE 115-a. The data transmission may be any sort of wireless transmission sent over a wireless channel configured with multiple CCs. The UE 115-a may decode the data transmission using a decoder. At 315, the UE 115-a may determine that there are one or more decoding errors with the data transmission, which may show that the wireless channel may have caused errors to the data transmission over one or more CCs. For example, the wireless channel may be poor due to interference, multipath, weather conditions, or the like. In some examples, the UE 115-a may perform the described techniques wherever a decoding error is detected. In other examples, the UE 115-a may perform the described techniques only when a threshold number of errors is found in the decoded data transmission.

At 320, the UE 115-a may use the determined feedback protocol to select a subset of the CCs to report second stage feedback on. For example, only 4 of 8 CCs may be selected to have their second stage feedback included, based on the feedback protocol. If there is a conflict between two or more CCs using the feedback protocol, an ordering may be used as a tie breaker. Alternatively, a backup or secondary feedback protocol may be used to break the tie.

At 325, the UE 115-a may generate the feedback information. That is, the first stage feedback may be generated as well as the second stage feedback based on the inclusion of the subset of CCs.

At 330, the UE 115-a may jointly encode feedback for some CCs that were not part of the selected subset of CCs if there are any bits leftover in the second stage feedback information. With joint encoding, two or more UCI bits across two or more CCs may be generated and included in the feedback information. Joint encoding may be triggered after the CC subset selection. The UE 115-a may determine any CCs whose second stage feedback information needs bundling. Then the second stage feedback for those CCs may be jointly encoded.

As an example, assume the RRC has configured the upper bound to be L=2K+m bits and that the CCs priority levels are that CC1 has highest CBGs NACKs (highest priority), then CC2, then CC3, then CC4, then CC5. First, the second stage feedback for CC1 and CC2 would be selected because they have the highest priority and can fit into L=2K+m bits. The second stage feedback for CC3, CC4, and CC5 may be bundled into the m left-over bits. The second stage feedback for CC3, CC4, and CC5 may be jointly encoded into m bits, where m≤K. An index may be used for how to jointly encode based on how many bits are leftover.

If there are 3 bits leftover (m=3), and if DTX is given the priority of reporting, the m bits could be used to report DTX of the leftover CCs. If m>3, the three bits could still be used for DTX while the fourth bit could be used to report extra information about CQI for all remaining CCs or the CC among those CCs with the highest priority. Table 1 may be used in this example:

TABLE 1

| Bit value | Carried info |
|---|---|
| 000 | CC 3/4/5 report DTX |
| 001 | CC3 reports DTX, CC4 reports DTX, CC5 report CQI level 0 |
| 010 | CC3 reports DTX, CC4 reports CQI level 0, CC5 reports DTX |
| 011 | CC3 reports DTX, CC4/CC5 report CQI level 0 |
| 100 | CC3 reports CQI level 0, CC4 reports DTX, CC5 reports DTX |
| 101 | CC3 reports CQI level 0, CC4 reports DTX, CC5 reports CQI level 0 |
| 110 | CC3 reports CQI level 0, CC4 reports CQI level 0, CC5 reports DTX |
| 111 | CC3 reports CQI level 0, CC4 reports CQI level 0, CC5 reports CQI level 0 |

As shown in Table 1, the given bit values show what is reported for three CCs. The base station 105-a and the UE 115-a may have access to this table, as well as the tables shown below. If m changes, then another table may be used.

Alternatively, instead of encoding the three CCs, the UE 115-a may use the m bits to encode two CCs (with higher priority than the third remaining CC), or only a single CC (the highest priority one among the remaining CCs). This should be agreed upon by the base station 105-a and the UE 115-a.

If m=4, then Table 2 may be used. Level 0 may not need to be signaled and it may just indicate to the base station 105-a to adjust its retransmission parameters without any help from the UE 115-a. CQI level 0 may be a base station implementation. Levels 1 and 2 may be quantization of reduction of CQI needed and these levels could be signaled using RRC/MAC-CE signals and may be known at the base station 105-a and the UE 115-a. How much reduction may be relative to previous CQI.

TABLE 2

| Bit value | Carried info |
|---|---|
| 0000 | CC 3/4/5 report DTX |
| 0001 | CC3 reports DTX, CC4 reports DTX, CC5 report CQI level 0 |
| 0010 | CC3 reports DTX, CC4 reports CQI level 0, CC5 reports DTX |
| 0011 | CC3 reports DTX, CC4/CC5 report CQI level 0 |
| 0100 | CC3 reports CQI level 0, CC4 reports DTX, CC5 reports DTX |
| 0101 | CC3 reports CQI level 0, CC4 reports DTX, CC5 reports CQI level 0 |
| 0110 | CC3 reports CQI level 0, CC4 reports CQI level 0, CC5 reports DTX |
| 0111 | CC3 reports CQI level 0, CC4 reports CQI level 0, CC5 reports CQI level 0 |
| 1000 | CC3 CQI with level 1, CC4 CQI level 1, CC5 CQI level 1 |
| 1001 | CC3 CQI with level 1, CC4 CQI level 1, CC5 CQI level 2 |
| 1010 | CC3 CQI with level 1, CC4 CQI level 2, CC5 CQI level 1 |
| 1011 | CC3 CQI with level 1, CC4 CQI level 2, CC5 CQI level 2 |
| 1100 | CC3 CQI with level 2, CC4 CQI level 1, CC5 CQI level 1 |
| 1101 | CC3 CQI with level 2, CC4 CQI level 1, CC5 CQI level 2 |

TABLE 2-continued

| Bit value | Carried info |
| --- | --- |
| 1110 | CC3 CQI with level 2, CC4 CQI level 2, CC5 CQI level 1 |
| 1111 | CC3 CQI with level 2, CC4 CQI level 2, CC5 CQI level 2 |

If m=2, and this is less than the number of remaining CCs, then two options may be used. First, two of the remaining CCs may be signaled jointly and omit the rest of the remaining CCs. Alternatively, only one of the remaining CCs may be encoded and all of the rest may be omitted. Table 3 may be used for m=2;

TABLE 4

| Bit value | Carried info |
| --- | --- |
| 00 | Both CC3/4 report DTX |
| 01 | CC3 DTX, CC4 reports CQI level 0 (simply not DTX) |
| 10 | CC3 reports CQI level 0 (not DTX), CC4 DTX |
| 11 | Both CC3 and 4 report CQI level 0 (not DTX) |

Additionally, there may be modes of joint encoding which may be initially signaled through RRC or MAC-CE and then dynamically signaled through DCI. A first mode of joint encoding may have encoding across all CCs (that is, joint encoding of all CCs). All of the CCs may be jointly encoded using the L bits using techniques described herein.

A second mode may have joint encoding across all remaining CCs. That is, joint encoding may be performed for all remaining CCs after assigning bits to higher priority CCs. After assigning bits to the highest priority CCs, the remaining number of bits that may be assigned to the remaining CCs could be used jointly encode the information on the CC.

A third mode may jointly encode across one or few remaining CCs (e.g., joint encoding a set of remaining CCs). This mode may use the remaining bits to encode the feedback of one or a few (e.g., a subset) of CCs. The exact (e.g., maximum) number of remaining CCs to encode jointly could be signaled as well. For example, if the maximum number is Y, then if Y=1, the UE 115-a may use the remaining bits to encode the data of the CC with the highest priority among the remaining CCs. Then, the UE 115-a may omit the remaining CCs. If Y=2, the UE 115-a may use the remaining bits to encode the data of the two CCs with highest priority among the remaining CCs. Then, the UE 115-a may omit the remaining CCs. If Y=3, the UE 115-a may use the remaining bits to encode the data of the three CCs with highest priority among the remaining CCs. Then, the UE 115-a may omit the remaining CCs.

Any of these feedback protocols and joint encoding methods may be used in conjunction in different ways. For example, a feedback protocol may be used to select the first subset of CCs to include in the feedback information, and any leftover information may be jointly encoded. As another example, the feedback protocol may indicate that all CCs are to be jointly encoded. Any combination of the feedback protocols and joint encoding is contemplated herein.

Returning again to FIG. 3, at 335 the UE 115-a may transmit the feedback message with the CQI, MCS, or DCI miss detection information to the base station 115-a. The feedback message may include first stage and second stage feedback information. For example, the feedback message may include indications of one or more of a CQI index, a number of transmission layers, a transmission rank, channel state information, DTX, or combinations thereof. In some examples, the feedback message may include an indication of the CQI index. In other examples, the feedback message may include an indication of the CQI index and the transmission rank. In other examples, the feedback message may include an indication of the transmission rank or layers. The feedback message may also include a NACK.

The base station 105-a may receive the feedback message and determine the feedback information from the feedback message. At 340, the base station 105-a may update one or more transmission parameters based on the feedback message. For example, the base station 105-a may adjust an MCS or a number of transmission layers used for a retransmission of the data packet, or for subsequent transmissions of other data packets. The base station 105-a may retransmit at least some of the data to the UE 115-a at 345.

Techniques described herein may leverage Turbo-HARQ to improve fidelity and reduce data errors. The Turbo-HARQ feedback size may be a fixed or known size using techniques described herein.

Figure 4:
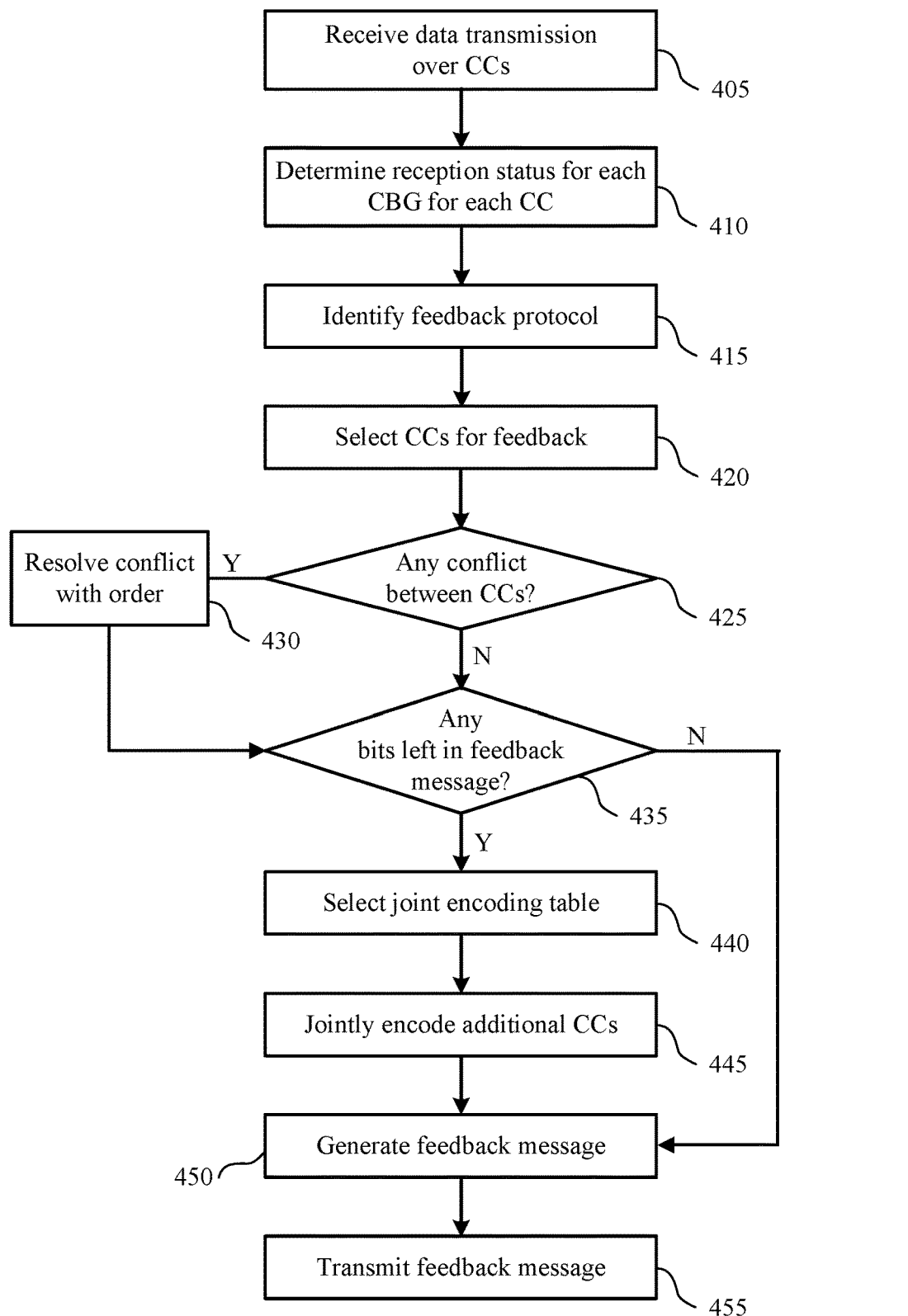
FIG. 4 shows a flowchart for a method that supports turbo-HARQ UCI feedback compression in accordance with aspects of the present disclosure.

FIG. 4 shows a flowchart for a method 400 that supports turbo-HARQ UCI feedback compression in accordance with aspects of the present disclosure. In some examples, the method 400 may implement aspects of wireless communication system 100. The method 400 may be implemented by a UE.

At 405, the UE may receive a data transmission over a plurality of CCs. At 410, the UE may determine the reception status for each CC. That is, each CBG of each CC may have a reception status of being received (ACK) or not received (NACK). At 415, the feedback protocol to be used to send the second stage feedback information may be identified. In some examples, the second stage feedback information may be identified before transmission of the data, such as through other signaling.

At 420, the UE may select a subset of CCs that can be included in the second stage feedback information based on the feedback protocol. However, in some examples, all of the CCs will be used in a joint encoding method.

At 425, the UE may determine if there are any conflicts between priority levels for two or more CCs based on the feedback protocol. If so, method 400 proceeds to 430 and resolves the conflict using an order of omissions. If not, method 400 proceeds to 435 to determine if there are any bits leftover in the second stage feedback information after the selected CCs are included. If so, method 400 proceeds to 440. If not, method 400 proceeds to 450.

At 440, the UE may select a joint encoding table based on the size of m, the leftover bits. At 445, the UE may select the CCs for joint encoding and encode them according to the selected table.

At 450, the feedback message may be generated. The feedback message may include the first stage feedback information and the second stage feedback information, which may include the subset of the selected CCs and any joint encoding. In some examples, the second stage feedback information only includes joint encoding.

At 455, the UE transmits the feedback message to the transmitter of the data transmission. The recipient of the feedback message may be able to decode the second stage feedback information without first decoding the first stage feedback information because of the fixed size of the feedback message.

Figure 5:
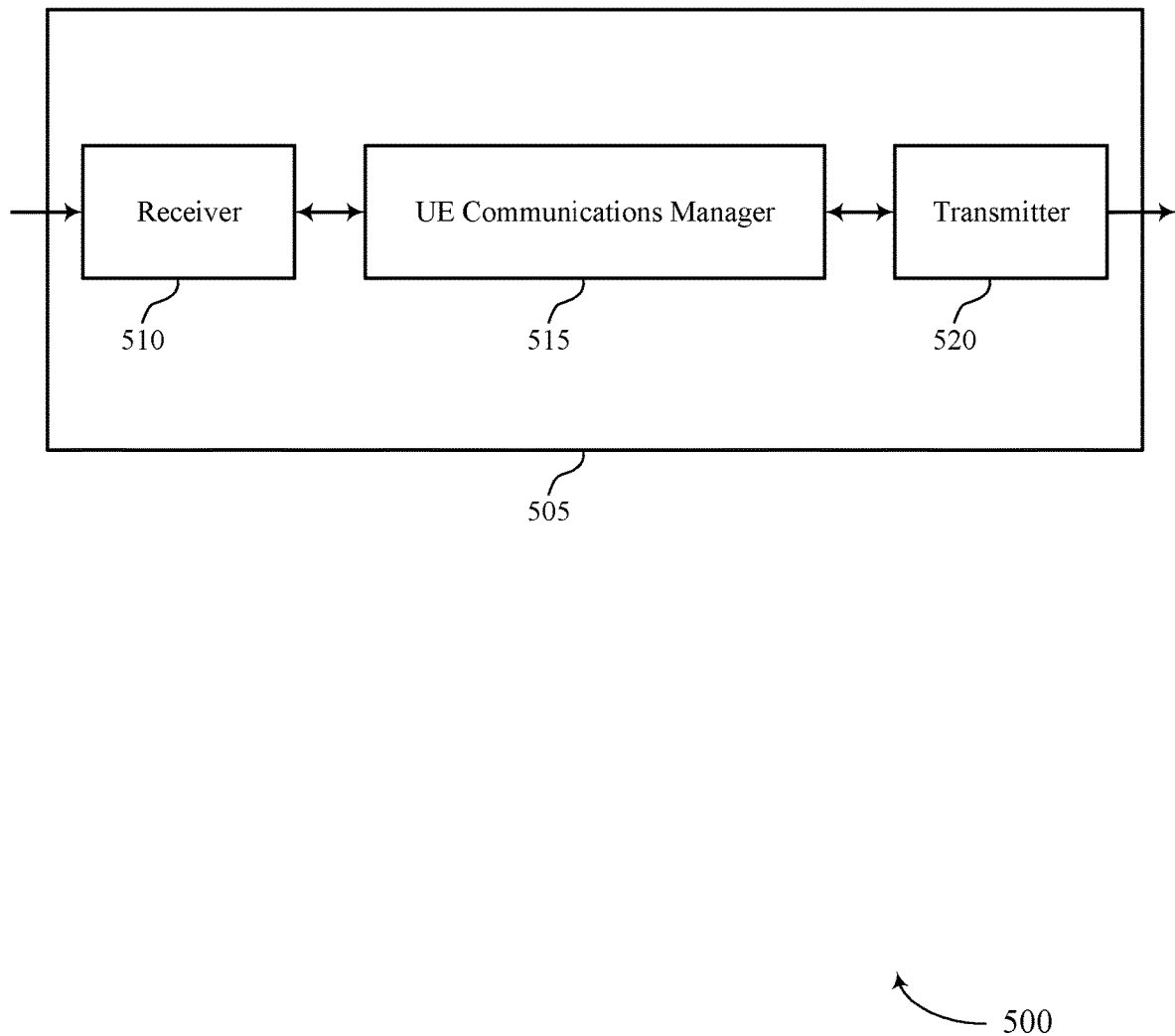
FIGS. 5 and 6 show block diagrams of devices that support turbo-HARQ UCI feedback compression in accordance with aspects of the present disclosure.

FIG. 5 shows a block diagram 500 of a device 505 that supports turbo-HARQ UCI feedback compression in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to turbo-HARQ UCI feedback compression, such as the feedback protocol, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive a data transmission for each of a set of component carriers over a wireless channel from a base station, where each data transmission is associated with a number of code block groups. The UE communications manager 515 may generate the feedback information based on the subset of the set of component carriers and the feedback protocol and transmit a feedback message that indicates the feedback information for the subset of the set of component carriers of the wireless channel to the base station. The UE communications manager 515 may identify a feedback protocol to apply to the set of component carriers and select a subset of the set of component carriers for which to report feedback information for the code block groups based on the feedback protocol. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may transmit a feedback message. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
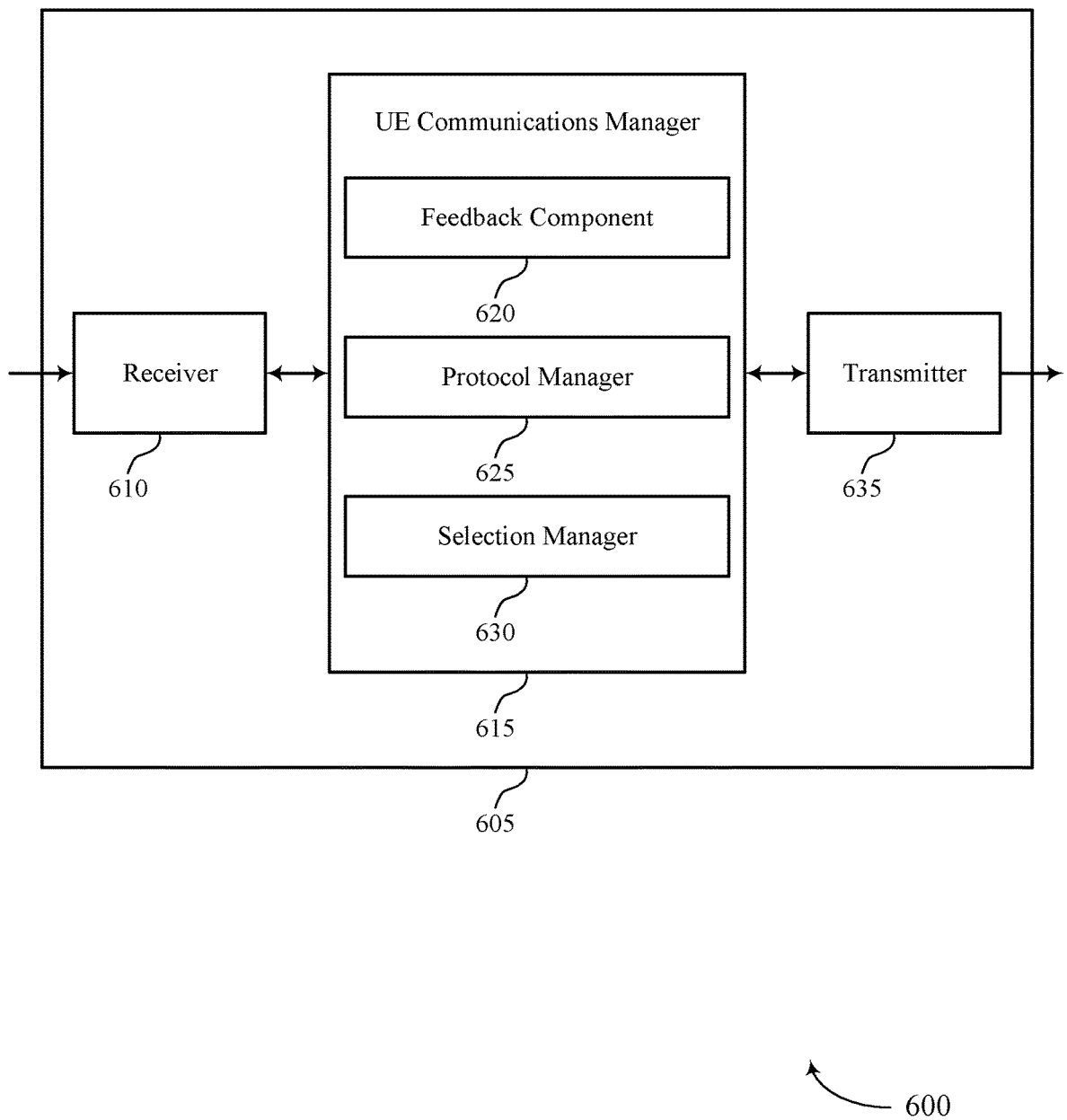

FIG. 6 shows a block diagram 600 of a device 605 that supports turbo-HARQ UCI feedback compression in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to turbo-HARQ UCI feedback compression, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a feedback component 620, a protocol manager 625, and a selection manager 630. The UE communications manager 615 may be an example of aspects of the UE communications manager 810 described herein.

The feedback component 620 may receive a data transmission for each of a set of component carriers over a wireless channel from a base station, where each data transmission is associated with a number of code block groups, generate the feedback information based on the subset of the set of component carriers and the feedback protocol, and transmit a feedback message that indicates the feedback information for the subset of the set of component carriers of the wireless channel to the base station.

The protocol manager 625 may identify a feedback protocol to apply to the set of component carriers.

The selection manager 630 may select a subset of the set of component carriers for which to report feedback information for the code block groups based on the feedback protocol.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
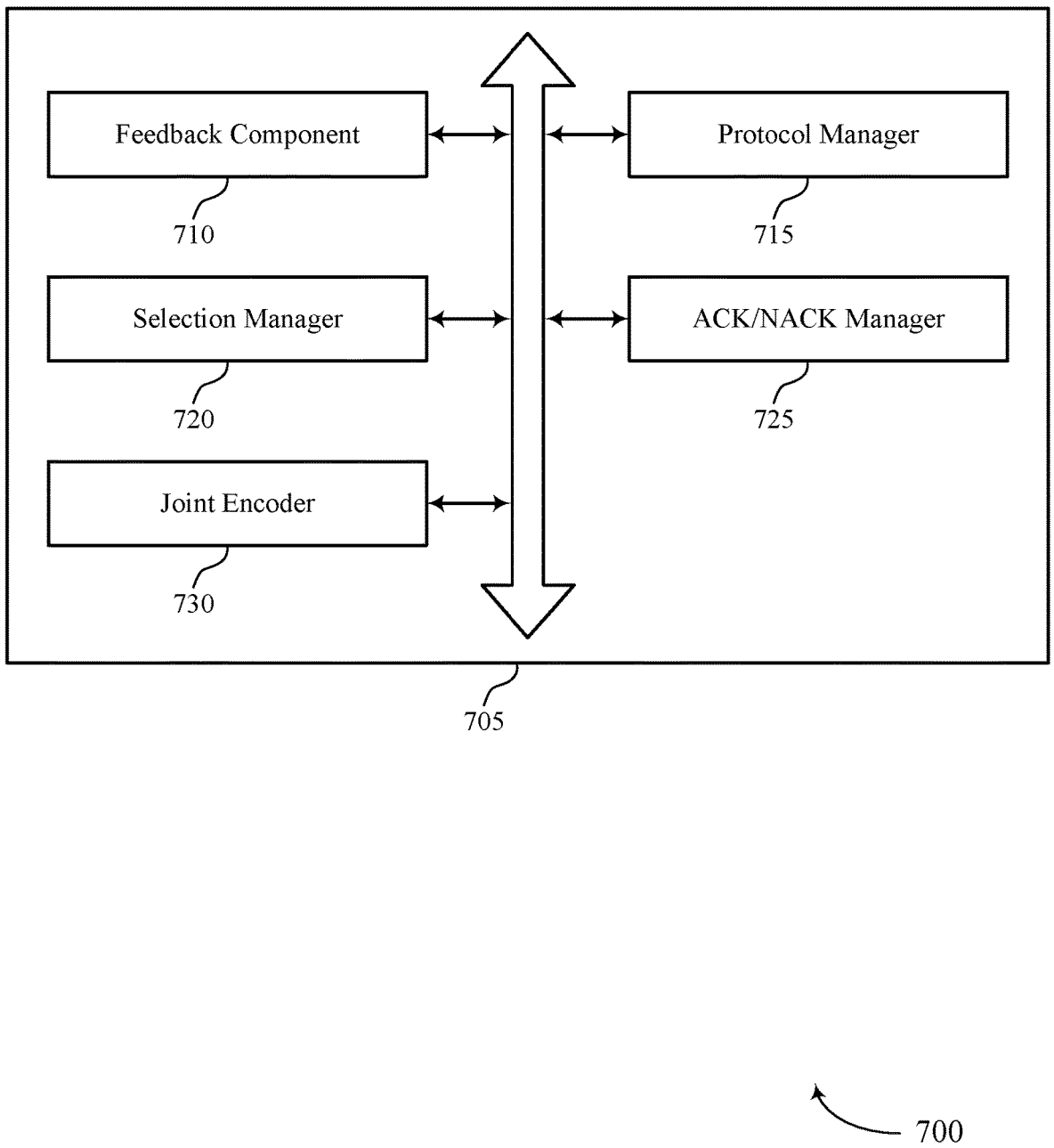
FIG. 7 shows a block diagram of a UE communications manager that supports turbo-HARQ UCI feedback compression in accordance with aspects of the present disclosure.

FIG. 7 shows a block diagram 700 of a UE communications manager 705 that supports turbo-HARQ UCI feedback compression in accordance with aspects of the present disclosure. The UE communications manager 705 may be an example of aspects of a UE communications manager 515, a UE communications manager 615, or a UE communications manager 810 described herein. The UE communications manager 705 may include a feedback component 710, a protocol manager 715, a selection manager 720, an ACK/NACK manager 725, and a joint encoder 730. Each of these modules may communicate, directly or indirectly, with one another (e.g., via one or more buses).

The UE communications manager 705 may receive, forwarded from a receiver, a data transmission for each of a set of component carriers over a wireless channel from a base station, where each data transmission is associated with a number of code block groups.

The protocol manager 715 may identify a feedback protocol to apply to the set of component carriers. In some examples, the protocol manager 715 may receive an indication of the feedback protocol from a base station, where identifying the feedback protocol is based on receiving the signal. In some cases, the indication of the feedback protocol is included in one of a radio resource control signal, a MAC control element, or a downlink control information message.

In some examples, the protocol manager 715 may determine a maximum number of bits for the feedback information, where generating the feedback information is based on the maximum number of bits. In other examples, the protocol manager 715 may determine a maximum size of the subset of the set of component carriers.

In some examples, the protocol manager 715 may determine a conflict between a first component carrier and a second component carrier having a same priority. In some examples, the protocol manager 715 may select one of the first component carrier and the second component carrier based on an order of the component carriers. In some cases, the order of priority of the component carriers is based on at least one of a component carrier index, a mapping of each component carrier to a priority level, a type of information included in the data transmission for each component carrier, a quality-of-service requirement for each component carrier, or a priority of the information included in the data transmission for each component carrier.

In some cases, the feedback protocol defines a maximum number of component carriers to be included in the subset of component carriers, and where selecting a subset of the set of component carriers for which to report feedback information for the code block groups is based on the maximum number.

The selection manager 720 may select a subset of the set of component carriers for which to report feedback information for the code block groups based on the feedback protocol. In some examples, the selection manager 720 may include the highest priority component carriers with at least one failed code block group in the subset of the set of component carriers up to the maximum size of the subset of the set of component carriers, where generating the feedback information is based on the inclusion.

In some examples, the selection manager 720 may include those component carriers with at least one failed code block group in the subset of the set of component carriers based on the order, where generating the feedback information is based on the inclusion. In some examples, the selection manager 720 may include the component carriers that have at least the threshold number of failed code block groups in the subset of the set of component carriers, where generating the feedback information is based on the inclusion. In some cases, the threshold number of failed code block groups includes a ratio of the failed code block groups in each component carrier to a total number of code block groups in that component carrier. In some cases, the threshold number of failed code block groups includes a percentage of the failed code block groups in each component carrier.

In some examples, the selection manager 720 may prioritize the component carriers with the higher numbers of failed code block groups in the subset of the set of component carriers. In some cases, the two or more component carriers are not included in the subset of component carriers.

The ACK/NACK manager 725 may determine a reception status for each code block group of each of the data transmissions for each of the set of component carriers, where the feedback information is based on the reception status. In some examples, the ACK/NACK manager 725 may identify the component carriers that have a failed code block group. In some examples, the ACK/NACK manager 725 may identify those component carriers that have at least the threshold number of failed code block groups.

The joint encoder 730 may encode additional feedback information for two or more component carriers into joint feedback information, where generating the feedback information is further based on the joint feedback information. In some examples, the joint encoder 730 may determine that a size of the feedback information is less than a total size for the feedback message, where encoding the additional feedback information is based on the determination that the size of the feedback information is less than the total size. In some examples, the joint encoder 730 may apply a coding table to the additional feedback information to encode the joint feedback information.

The feedback component 710 may generate the feedback information based on the subset of the set of component carriers and the feedback protocol. In some cases, the feedback information includes one or more of a CQI, an MCS, or a DCI miss detection.

The UE communications manager 705 may transmit a feedback message that indicates the feedback information for the subset of the set of component carriers of the wireless channel to the base station.

Figure 8:
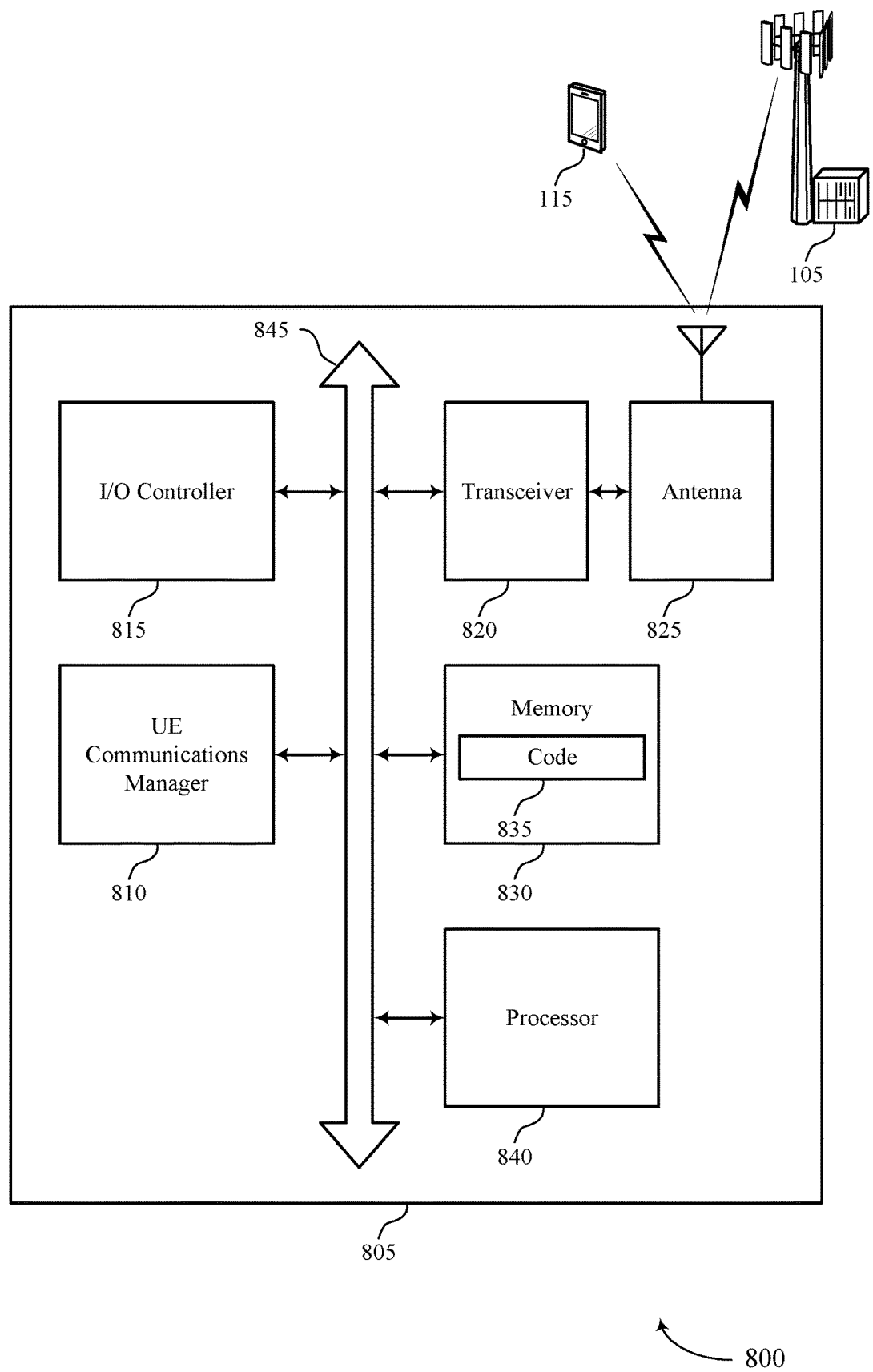
FIG. 8 shows a diagram of a system including a device that supports turbo-HARQ UCI feedback compression in accordance with aspects of the present disclosure.

FIG. 8 shows a diagram of a system 800 including a device 805 that supports turbo-HARQ UCI feedback compression in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a data transmission for each of a set of component carriers over a wireless channel from a base station, where each data transmission is associated with a number of code block groups, generate the feedback information based on the subset of the set of component carriers and the feedback protocol, transmit a feedback message that indicates the feedback information for the subset of the set of component carriers of the wireless channel to the base station, identify a feedback protocol to apply to the set of component carriers, and select a subset of the set of component carriers for which to report feedback information for the code block groups based on the feedback protocol.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices. In some examples, the memory 830 may store tables used for joint encoding.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting turbo-HARQ UCI feedback compression).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
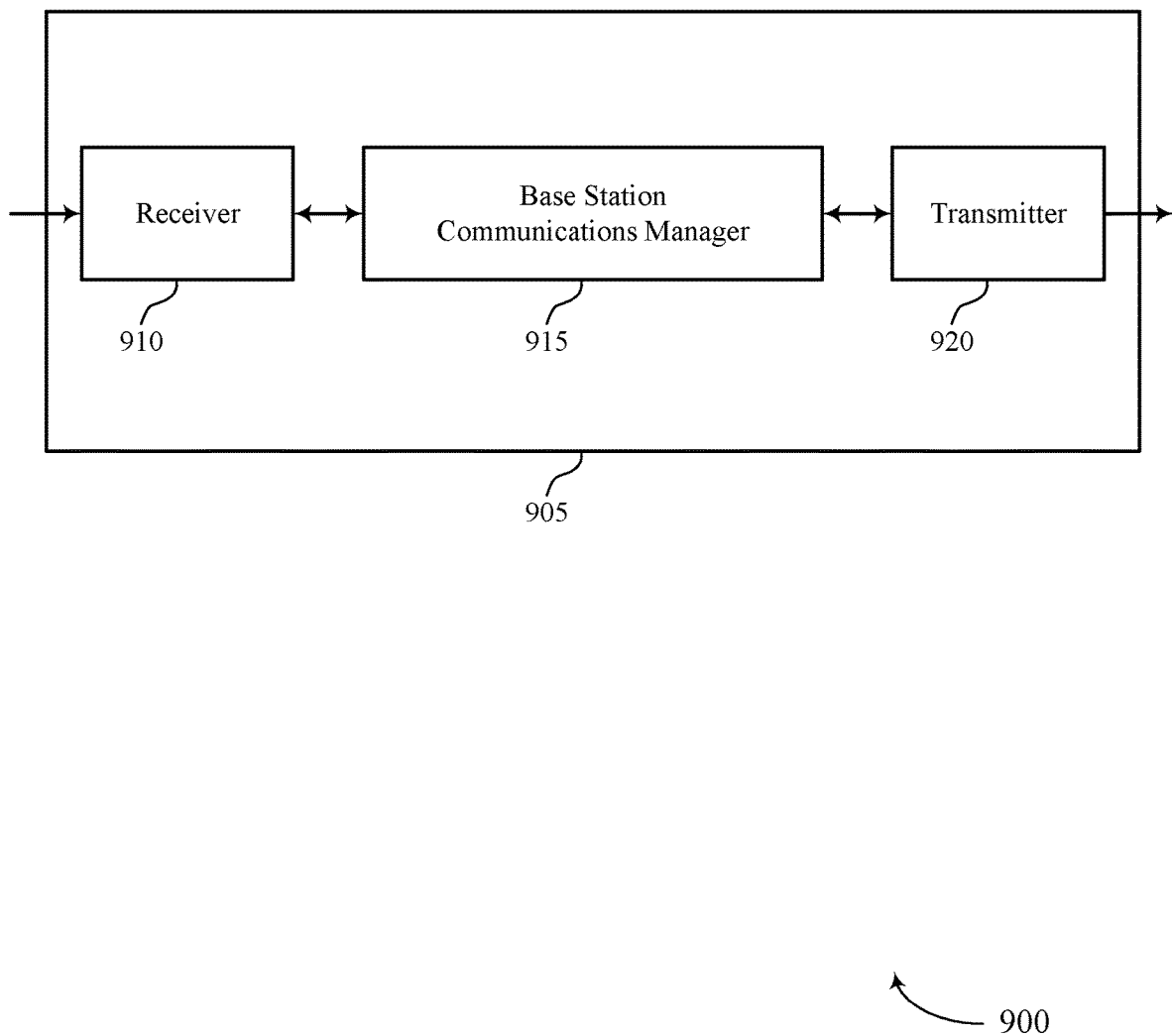
FIGS. 9 and 10 show block diagrams of devices that support turbo-HARQ UCI feedback compression in accordance with aspects of the present disclosure.

FIG. 9 shows a block diagram 900 of a device 905 that supports turbo-HARQ UCI feedback compression in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to turbo-HARQ UCI feedback compression, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may determine a feedback protocol. In some examples, the base station communications manager 915 may decide the feedback protocol and generate a signal to indicate the feedback protocol to a UE. In other examples, the base station communications manager 915 negotiates with the UE to determine the feedback protocol and may generate signal the feedback protocol to the UE. The base station communications manager 915 may be an example of aspects of the base station communications manager 165 and 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
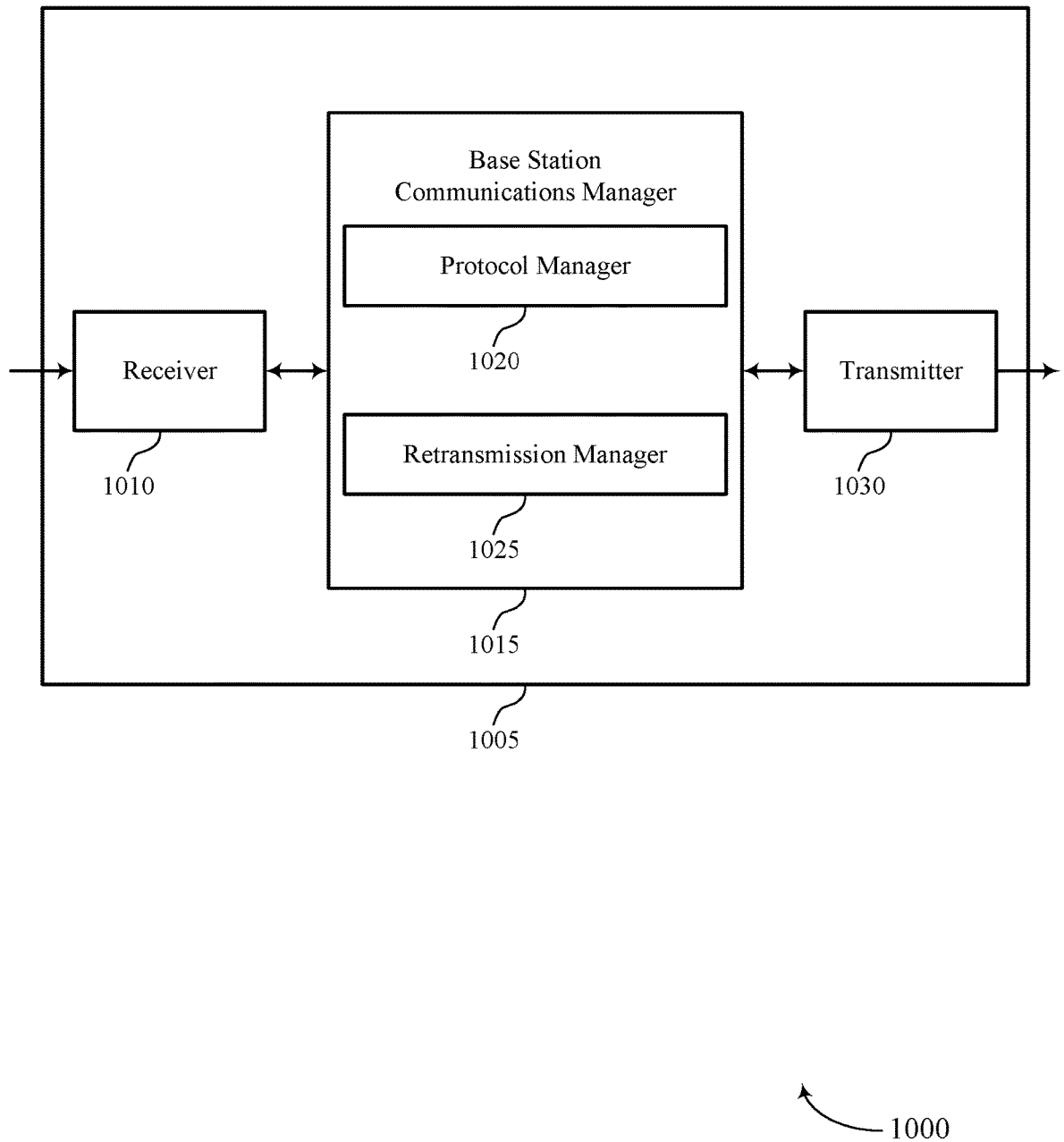

FIG. 10 shows a block diagram 1000 of a device 1005 that supports turbo-HARQ UCI feedback compression in accordance with aspects of the present disclosure. The device 1005 may be an example of aspects of a device 905, or a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to turbo-HARQ UCI feedback compression, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a protocol manager 1020 and a retransmission manager 1025. The base station communications manager 1015 may be an example of aspects of the base station communications manager 1210 described herein.

The protocol manager 1020 may identify the feedback protocol to be used. The protocol manager 1020 may signal the feedback protocol to a UE. The retransmission manager 1025 may instruct the transmitter 1030 to retransmit at least a portion of the data packet based on the updated transmission parameters.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of antennas.

Figure 11:
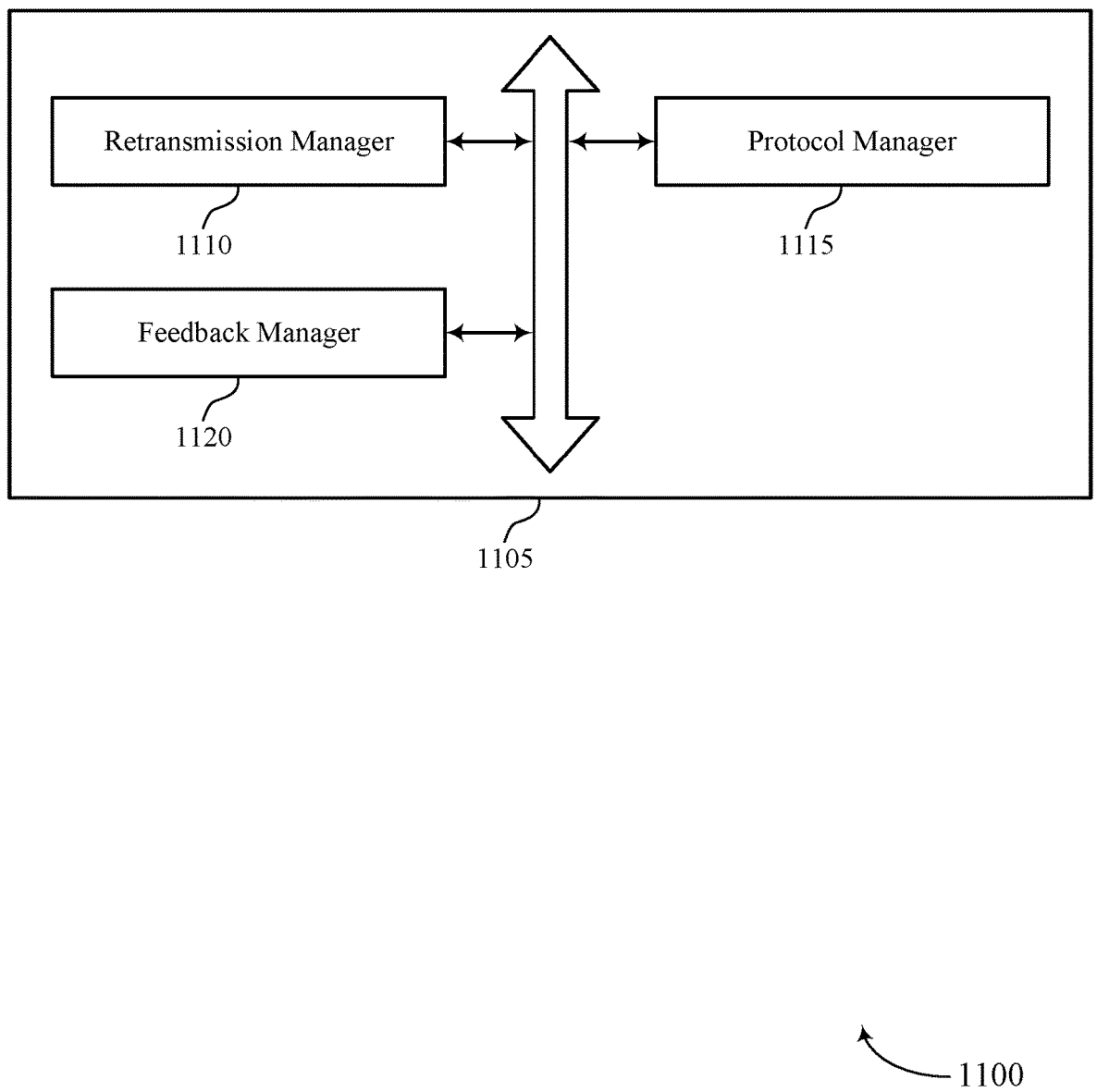
FIG. 11 shows a block diagram of a base station communications manager that supports turbo-HARQ UCI feedback compression in accordance with aspects of the present disclosure.

FIG. 11 shows a block diagram 1100 of a base station communications manager 1105 that supports turbo-HARQ UCI feedback compression in accordance with aspects of the present disclosure. The base station communications manager 1105 may be an example of aspects of a base station communications manager 915, a base station communications manager 1015, or a base station communications manager 1210 described herein. The base station communications manager 1105 may include a protocol manager 1115, a retransmission manager 1110, and a feedback manager 1120. Each of these modules may communicate, directly or indirectly, with one another (e.g., via one or more buses).

The protocol manager 1115 may identify the feedback protocol to be used. The protocol manager 1115 may signal the feedback protocol to a UE. The protocol manager 1115 may use any feedback protocol and joint encoding as described herein.

The feedback manager 1120 may update a transmission parameter based on the channel quality indicator or the DTX received in the feedback message. In some examples, the feedback manager 1120 may update a modulation and coding scheme based on the first and second stage feedback information. In some examples, the feedback manager 1120 may update a coding length for retransmitting the data based on the channel state information or the transmission rank. In some examples, the feedback manager 1120 may update resources used for retransmitting the data based on the feedback message.

The modulation manager 1115 may update one or more modulation parameters. The retransmission manager 1110 may cause a transmitter of the base station to retransmit at least a portion of the data transmission over the wireless channel using the updated transmission parameter.

Figure 12:
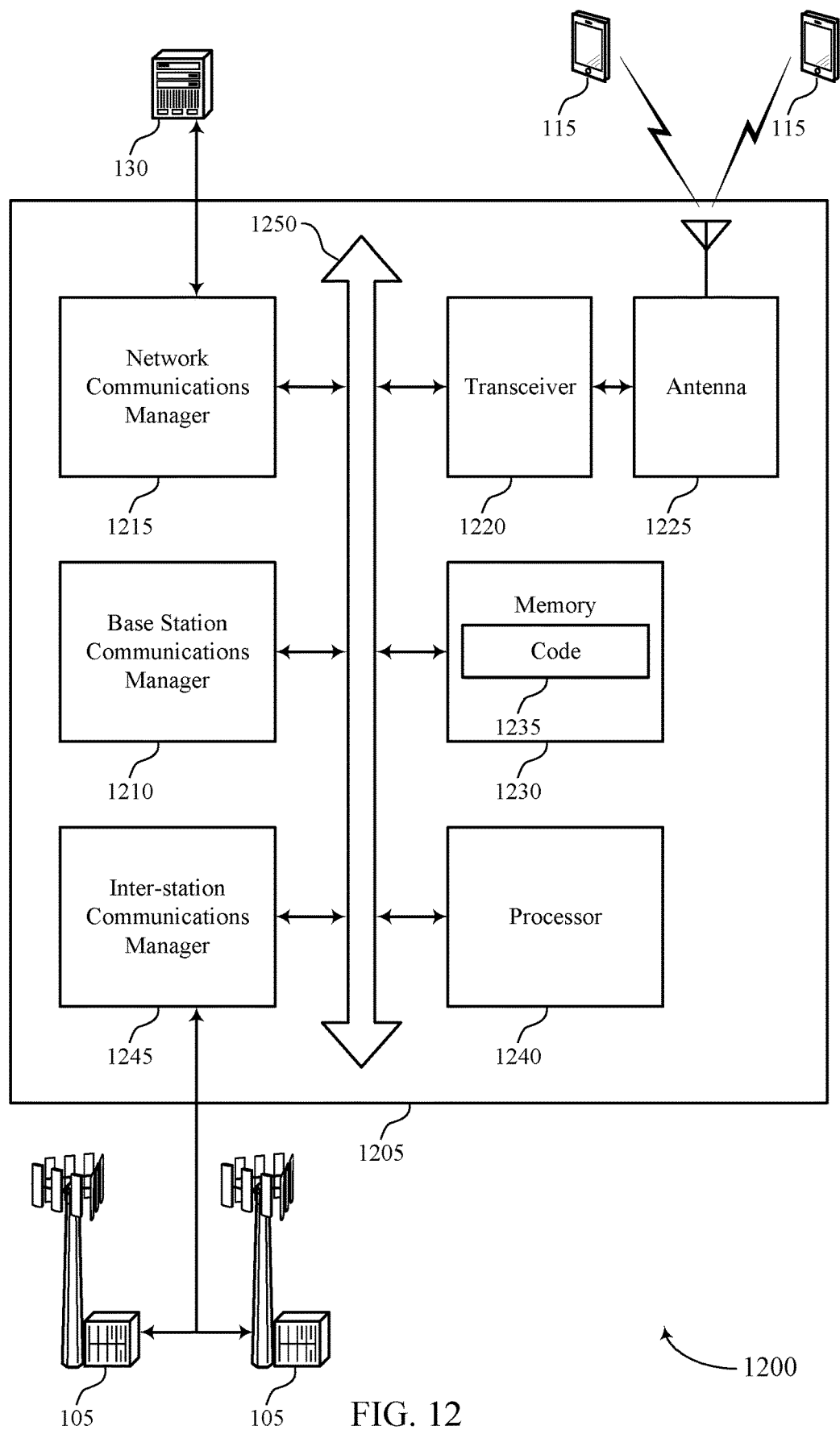
FIG. 12 shows a diagram of a system including a device that supports turbo-HARQ UCI feedback compression in accordance with aspects of the present disclosure.

FIG. 12 shows a diagram of a system 1200 including a device 1205 that supports turbo-HARQ UCI feedback compression in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network base station communications manager 1215, a transceiver 1220, an antenna 1225, memory 1230, a processor 1240, and an inter-station base station communications manager 1245. These components may be in electronic communication via one or more buses (e.g., bus 1250).

The base station communications manager 1210 may negotiate or otherwise determine a feedback protocol, decode feedback information according to specifications of the feedback protocol, and adjust retransmissions based on the feedback information.

The network base station communications manager 1215 may manage communications with the core network (e.g., via one or more wired backhaul links). For example, the network base station communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting turbo-HARQ UCI feedback compression).

The inter-station base station communications manager 1245 may manage communications with other base station 105, and may include a controller or scheduler for controlling communications with UEs 115 in cooperation with other base stations 105. For example, the inter-station base station communications manager 1245 may coordinate scheduling for transmissions to UEs 115 for various interference mitigation techniques such as beamforming or joint transmission. In some examples, the inter-station base station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
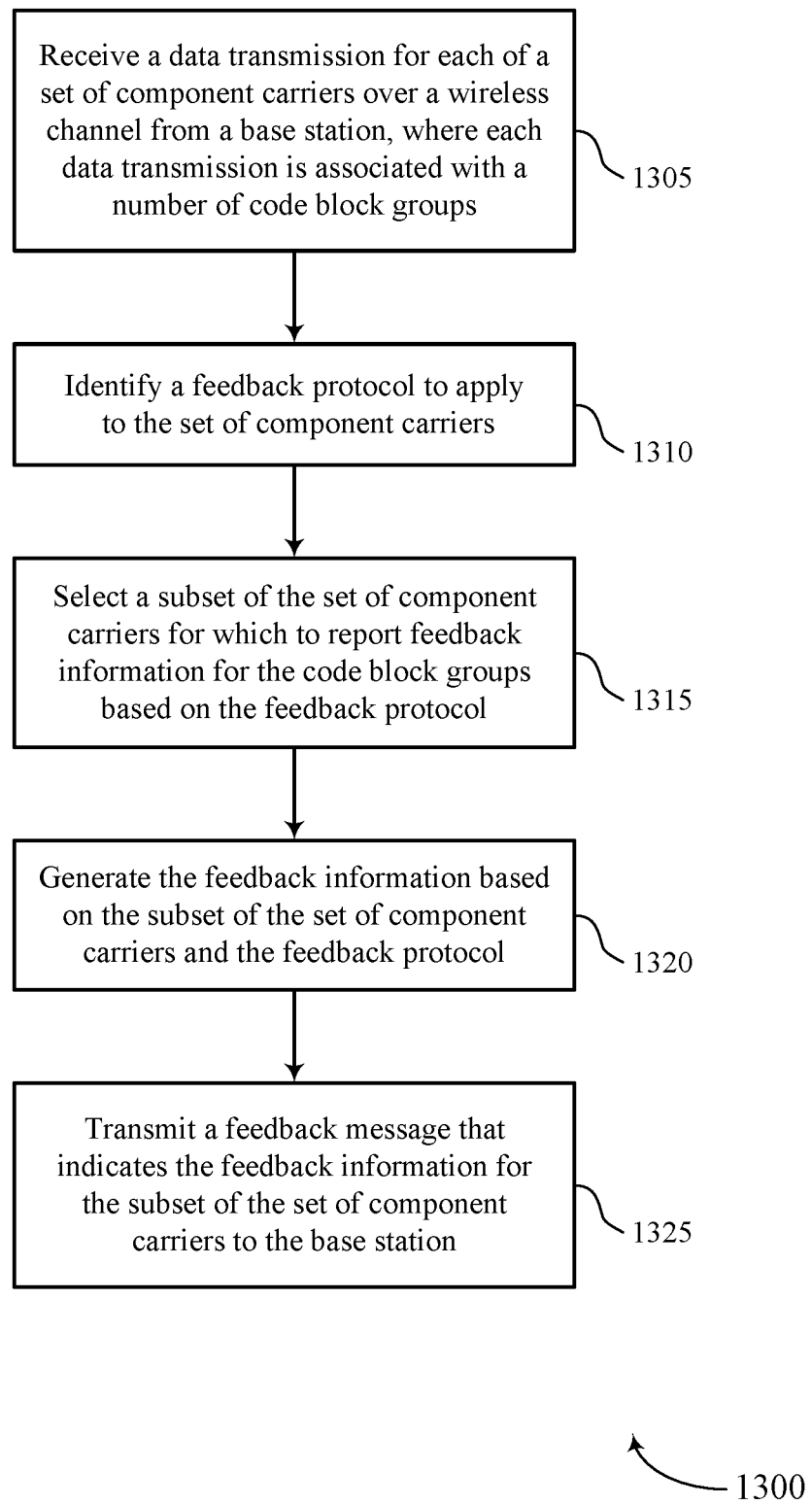
FIGS. 13 through 15 show flowcharts illustrating methods that support turbo-HARQ UCI feedback compression in accordance with aspects of the present disclosure.

FIG. 13 shows a flowchart illustrating a method 1300 that supports turbo-HARQ UCI feedback compression in accordance with aspects of the present disclosure. The operations of method 1300 may be implemented by a UE 115 or its components as described herein. For example, the operations of method 1300 may be performed by a communications manager as described with reference to FIGS. 1 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a data transmission for each of a set of component carriers over a wireless channel from a base station, where each data transmission is associated with a number of code block groups. The operations of 1305 may be performed according to the methods described herein. In some examples, aspects of the operations of 1305 may be performed by a feedback component as described with reference to FIGS. 5 through 8.

At 1310, the UE may identify a feedback protocol to apply to the set of component carriers. The operations of 1310 may be performed according to the methods described herein. In some examples, aspects of the operations of 1310 may be performed by a protocol manager as described with reference to FIGS. 5 through 8.

At 1315, the UE may select a subset of the set of component carriers for which to report feedback information for the code block groups based on the feedback protocol. The operations of 1315 may be performed according to the methods described herein. In some examples, aspects of the operations of 1315 may be performed by a selection manager as described with reference to FIGS. 5 through 8.

At 1320, the UE may generate the feedback information based on the subset of the set of component carriers and the feedback protocol. The operations of 1320 may be performed according to the methods described herein. In some examples, aspects of the operations of 1320 may be performed by a feedback component as described with reference to FIGS. 5 through 8.

At 1325, the UE may transmit a feedback message that indicates the feedback information for the subset of the set of component carriers of the wireless channel to the base station. The operations of 1325 may be performed according to the methods described herein. In some examples, aspects of the operations of 1325 may be performed by a feedback component as described with reference to FIGS. 5 through 8.

Figure 14:
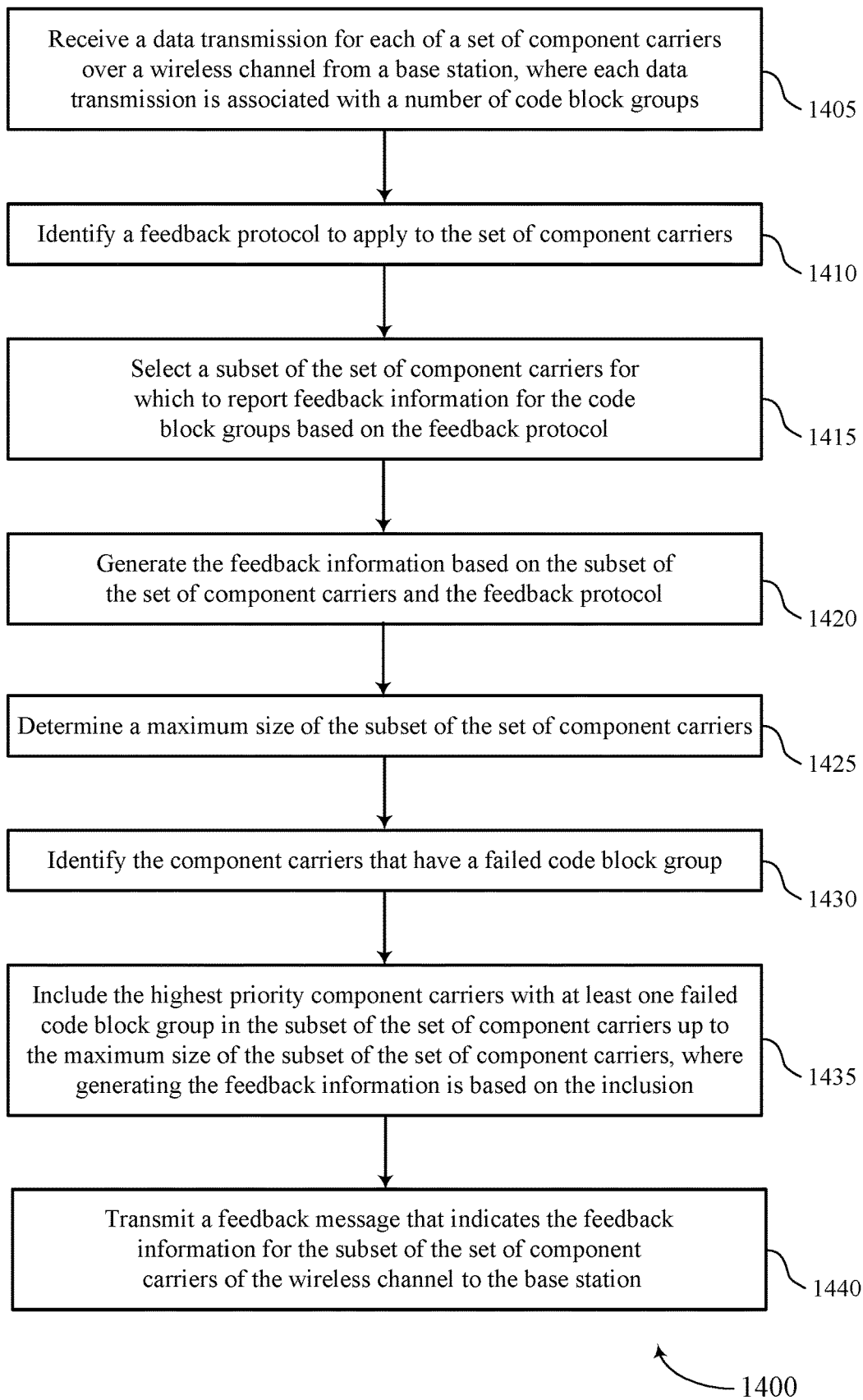

FIG. 14 shows a flowchart illustrating a method 1400 that supports turbo-HARQ UCI feedback compression in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a data transmission for each of a set of component carriers over a wireless channel from a base station, where each data transmission is associated with a number of code block groups. The operations of 1405 may be performed according to the methods described herein. In some examples, aspects of the operations of 1405 may be performed by a feedback component as described with reference to FIGS. 5 through 8.

At 1410, the UE may identify a feedback protocol to apply to the set of component carriers. The operations of 1410 may be performed according to the methods described herein. In some examples, aspects of the operations of 1410 may be performed by a protocol manager as described with reference to FIGS. 5 through 8.

At 1415, the UE may select a subset of the set of component carriers for which to report feedback information for the code block groups based on the feedback protocol. The operations of 1415 may be performed according to the methods described herein. In some examples, aspects of the operations of 1415 may be performed by a selection manager as described with reference to FIGS. 5 through 8.

At 1420, the UE may generate the feedback information based on the subset of the set of component carriers and the feedback protocol. The operations of 1420 may be performed according to the methods described herein. In some examples, aspects of the operations of 1420 may be performed by a feedback component as described with reference to FIGS. 5 through 8.

At 1425, the UE may determine a maximum size of the subset of the set of component carriers. The operations of 1425 may be performed according to the methods described herein. In some examples, aspects of the operations of 1425 may be performed by a protocol manager as described with reference to FIGS. 5 through 8.

At 1430, the UE may identify the component carriers that have a failed code block group. The operations of 1430 may be performed according to the methods described herein. In some examples, aspects of the operations of 1430 may be performed by an ACK/NACK manager as described with reference to FIGS. 5 through 8.

At 1435, the UE may include the highest priority component carriers with at least one failed code block group in the subset of the set of component carriers up to the maximum size of the subset of the set of component carriers, where generating the feedback information is based on the inclusion. The operations of 1435 may be performed according to the methods described herein. In some examples, aspects of the operations of 1435 may be performed by a selection manager as described with reference to FIGS. 5 through 8.

At 1440, the UE may transmit a feedback message that indicates the feedback information for the subset of the set of component carriers of the wireless channel to the base station. The operations of 1440 may be performed according to the methods described herein. In some examples, aspects of the operations of 1440 may be performed by a feedback component as described with reference to FIGS. 5 through 8.

Figure 15:
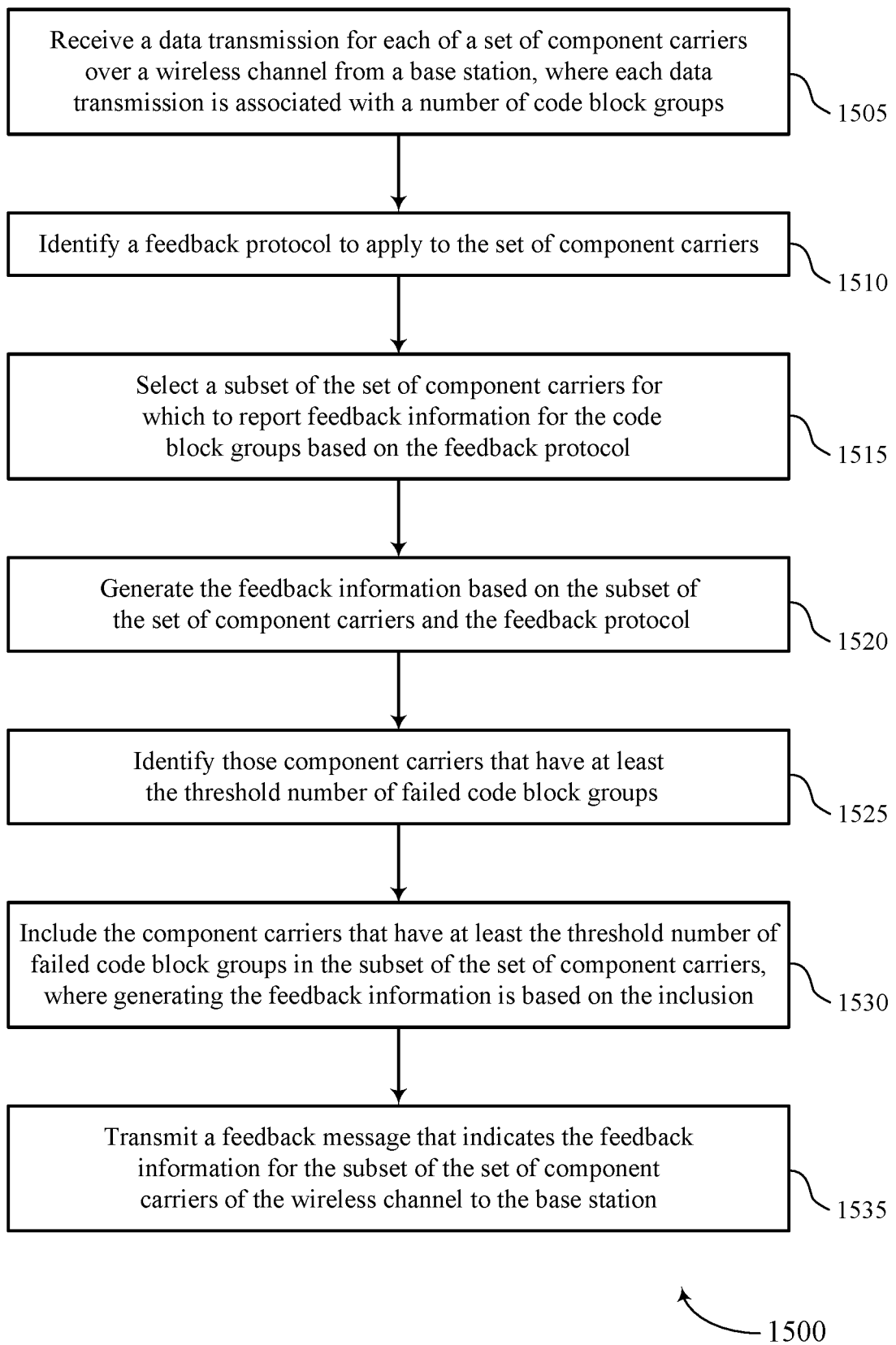

FIG. 15 shows a flowchart illustrating a method 1500 that supports turbo-HARQ UCI feedback compression in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a data transmission for each of a set of component carriers over a wireless channel from a base station, where each data transmission is associated with a number of code block groups. The operations of 1505 may be performed according to the methods described herein. In some examples, aspects of the operations of 1505 may be performed by a feedback component as described with reference to FIGS. 5 through 8.

At 1510, the UE may identify a feedback protocol to apply to the set of component carriers. The operations of 1510 may be performed according to the methods described herein. In some examples, aspects of the operations of 1510 may be performed by a protocol manager as described with reference to FIGS. 5 through 8.

At 1515, the UE may select a subset of the set of component carriers for which to report feedback information for the code block groups based on the feedback protocol. The operations of 1515 may be performed according to the methods described herein. In some examples, aspects of the operations of 1515 may be performed by a selection manager as described with reference to FIGS. 5 through 8.

At 1520, the UE may generate the feedback information based on the subset of the set of component carriers and the feedback protocol. The operations of 1520 may be performed according to the methods described herein. In some examples, aspects of the operations of 1520 may be performed by a feedback component as described with reference to FIGS. 5 through 8.

At 1525, the UE may identify those component carriers that have at least the threshold number of failed code block groups. The operations of 1525 may be performed according to the methods described herein. In some examples, aspects of the operations of 1525 may be performed by an ACK/NACK manager as described with reference to FIGS. 5 through 8.

At 1530, the UE may include the component carriers that have at least the threshold number of failed code block groups in the subset of the set of component carriers, where generating the feedback information is based on the inclusion. The operations of 1530 may be performed according to the methods described herein. In some examples, aspects of the operations of 1530 may be performed by a selection manager as described with reference to FIGS. 5 through 8.

At 1535, the UE may transmit a feedback message that indicates the feedback information for the subset of the set of component carriers of the wireless channel to the base station. The operations of 1535 may be performed according to the methods described herein. In some examples, aspects of the operations of 1535 may be performed by a feedback component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method of wireless communication at a UE, comprising: receiving a data transmission for each of a plurality of component carriers over a wireless channel from a base station, wherein each data transmission is associated with a number of code block groups; identifying a feedback protocol to apply to the plurality of component carriers; selecting a subset of the plurality of component carriers for which to report feedback information for the code block groups based at least in part on the feedback protocol; generating the feedback information based at least in part on the subset of the plurality of component carriers and the feedback protocol; and transmitting a feedback message that indicates the feedback information for the subset of the plurality of component carriers to the base station.

Aspect 2: The method of aspect 1, further comprising: determining a reception status for each code block group of each of the data transmissions for each of the plurality of component carriers, wherein the feedback information is based at least in part on the reception status.

Aspect 3: The method of any of aspects 1 through 2, further comprising: receiving an indication of the feedback protocol from the base station, wherein identifying the feedback protocol is based at least in part on receiving the indication.

Aspect 4: The method of aspect 3, wherein the indication of the feedback protocol is included in one of a radio resource control signal, a MAC control element, or a downlink control information message.

Aspect 5: The method of any of aspects 1 through 4, wherein the feedback information comprises one or more of a channel quality index, a modulation and coding scheme, or a downlink control information miss detection.

Aspect 6: The method of any of aspects 1 through 5, wherein identifying the feedback protocol further comprises: determining a maximum number of bits for the feedback information, wherein generating the feedback information is based at least in part on the maximum number of bits.

Aspect 7: The method of any of aspects 1 through 6, wherein the feedback protocol defines an order of priority of the component carriers, and wherein selecting a subset of the plurality of component carriers for which to report feedback information for the code block groups further comprises: determining a maximum size of the subset of the plurality of component carriers; identifying the component carriers that have a failed code block group; and including the highest priority component carriers with at least one failed code block group in the subset of the plurality of component carriers up to the maximum size of the subset of the plurality of component carriers, wherein generating the feedback information is based at least in part on the inclusion.

Aspect 8: The method of aspect 7, wherein the order of priority of the component carriers is based on at least one of a component carrier index, a mapping of each component carrier to a priority level, a type of information included in the data transmission for each component carrier, a quality-of-service requirement for each component carrier, or a priority of the information included in the data transmission for each component carrier.

Aspect 9: The method of any of aspects 7 through 8, further comprising: determining a conflict between a first component carrier and a second component carrier having a same priority; and selecting one of the first component carrier and the second component carrier based on an order of the component carriers.

Aspect 10: The method of any of aspects 1 through 9, wherein the feedback protocol defines an order of the component carriers, and wherein selecting a subset of the plurality of component carriers for which to report feedback information for the code block groups further comprises: identifying the component carriers that have a failed code block group; and including those component carriers with at least one failed code block group in the subset of the plurality of component carriers based at least in part on the order, wherein generating the feedback information is based at least in part on the inclusion.

Aspect 11: The method of any of aspects 1 through 10, wherein the feedback protocol defines a threshold number of failed code block groups, and wherein selecting a subset of the plurality of component carriers for which to report feedback information for the code block groups further comprises: identifying those component carriers that have at least the threshold number of failed code block groups; and including the component carriers that have at least the threshold number of failed code block groups in the subset of the plurality of component carriers, wherein generating the feedback information is based at least in part on the inclusion.

Aspect 12: The method of aspect 11, wherein including the component carriers that have at least the threshold number of failed code block groups further comprises: prioritizing the component carriers with the higher numbers of failed code block groups in the subset of the plurality of component carriers.

Aspect 13: The method of any of aspects 11 through 12, wherein the threshold number of failed code block groups comprises a ratio of the failed code block groups in each component carrier to a total number of code block groups in that component carrier.

Aspect 14: The method of any of aspects 11 through 13, wherein the threshold number of failed code block groups comprises a percentage of the failed code block groups in each component carrier.

Aspect 15: The method of any of aspects 1 through 14, wherein the feedback protocol defines a maximum number of component carriers to be included in the subset of component carriers, and selecting a subset of the plurality of component carriers for which to report feedback information for the code block groups is based at least in part on the maximum number.

Aspect 16: The method of any of aspects 1 through 15, further comprising: encoding additional feedback information for two or more component carriers into joint feedback information, wherein generating the feedback information is further based on the joint feedback information.

Aspect 17: The method of aspect 16, wherein the two or more component carriers are not included in the subset of component carriers.

Aspect 18: The method of any of aspects 16 through 17, further comprising: determining that a size of the feedback information is less than a total size for the feedback message, wherein encoding the additional feedback information is based on the determination that the size of the feedback information is less than the total size.

Aspect 19: The method of any of aspects 16 through 18, wherein encoding the additional feedback information further comprises: applying a coding table to the additional feedback information to encode the joint feedback information.

Aspect 20: A method of wireless communication at a base station, comprising: identifying a feedback protocol to apply to a plurality of component carriers to determine feedback information; transmit an indication of the feedback protocol to a user equipment (UE); transmit a data transmission for each of the plurality of component carriers over a wireless channel to the UE, wherein each data transmission is associated with a number of code block groups; and receive a feedback message that indicates feedback information for a subset of the plurality of component carriers of the wireless channel according to the feedback protocol from the UE.

Aspect 21: The method of aspect 20, further comprising: determining a reception status for each code block group of each of the data transmissions for each of the subset of the plurality of component carriers based at least in part on the feedback information.

Aspect 22: The method of any of aspects 20 through 21, wherein the feedback information comprises one or more of a channel quality index, a modulation and coding scheme, or a downlink control information miss detection.

Aspect 23: The method of any of aspects 20 through 22, wherein identifying the feedback protocol further comprises: determining a maximum number of bits for the feedback information, wherein identifying the feedback protocol is based at least in part on the maximum number of bits.

Aspect 24: The method of any of aspects 20 through 23, wherein the feedback protocol defines an order of priority of the component carriers.

Aspect 25: The method of aspect 24, wherein the order of priority of the component carriers is based on at least one of a component carrier index, a mapping of each component carrier to a priority level, a type of information included in the data transmission for each component carrier, a quality-of-service requirement for each component carrier, or a priority of the information included in the data transmission for each component carrier.

Aspect 26: The method of any of aspects 20 through 25, wherein the feedback protocol defines an order of the component carriers, a threshold number of failed code block groups, a maximum number of component carriers to be included in the subset of component carriers, and selecting a subset of the plurality of component carriers for which to report feedback information for the code block groups is based at least in part on the maximum number.

Aspect 27: The method of any of aspects 20 through 26, further comprising: decoding joint feedback information for two or more component carriers from the feedback information.

Aspect 28: The method of aspect 27, wherein the two or more component carriers are not included in the subset of component carriers.

Aspect 29: The method of any of aspects 20 through 28, wherein encoding the additional feedback information further comprises: applying a coding table to the additional feedback information to encode the joint feedback information.

Aspect 30: The method of any of aspects 20 through 29, wherein the indication of the feedback protocol is included in one of a radio resource control signal, a MAC control element, or a downlink control information message.

Aspect 31: An apparatus comprising a processor; memory coupled with the processor; and instructions stored in the memory and executable by the processor to cause the apparatus to perform a method of any of aspects 1 through 19.

Aspect 32: An apparatus comprising at least one means for performing a method of any of aspects 1 through 19.

Aspect 33: A non-transitory computer-readable medium storing code the code comprising instructions executable by a processor to perform a method of any of aspects 1 through 19.

Aspect 34: An apparatus comprising a processor; memory coupled with the processor; and instructions stored in the memory and executable by the processor to cause the apparatus to perform a method of any of aspects 20 through 30.

Aspect 35: An apparatus comprising at least one means for performing a method of any of aspects 20 through 30.

Aspect 36: A non-transitory computer-readable medium storing code the code comprising instructions executable by a processor to perform a method of any of aspects 20 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first network node for wireless communication, comprising:
   at least one memory; and
   at least one processor coupled with the at least one memory, wherein the first network node is configured to:
   receive a data transmission for each of a plurality of component carriers over a wireless channel from a second network node, wherein each data transmission is associated with a number of code block groups;
receive an indication of a feedback protocol from the second network node, wherein the feedback protocol applies to the plurality of component carriers and defines an order of priority of the plurality of component carriers;
determine a maximum quantity of component carriers for which to report feedback information;
identify component carriers that have a failed code block group from the plurality of component carriers;
select a subset of the plurality of component carriers for which to report feedback information for the number of code block groups based on the feedback protocol, wherein the subset of the plurality of component carriers includes highest priority component carriers with at least one failed code block group up to the maximum quantity of component carriers;
generate the feedback information based on the subset of the plurality of component carriers and the feedback protocol; and
transmit a feedback message that indicates the feedback information for the subset of the plurality of component carriers to the second network node.

2. The first network node of claim 1, wherein the first network node is further configured to:
determine a reception status for each code block group of each data transmission for each of the plurality of component carriers, wherein the feedback information is based on the reception status.

3. The first network node of claim 1, wherein the indication of the feedback protocol is included in one of a radio resource control signal, a media access control (MAC) control element, or a downlink control information message.

4. The first network node of claim 1, wherein the feedback information comprises one or more of a channel quality index, a modulation and coding scheme, or a downlink control information miss detection.

5. The first network node of claim 1, wherein the first network node is further configured to:
determine a maximum number of bits for the feedback information, wherein the feedback information is based on the maximum number of bits.

6. The first network node of claim 1, wherein the order of priority of the plurality of component carriers is based on at least one of a component carrier index, a mapping of each component carrier to a priority level, a type of information included in the data transmission for each component carrier, a quality-of-service requirement for each component carrier, or a priority of the information included in the data transmission for each component carrier.

7. The first network node of claim 1, wherein the first network node is further configured to:
determine a conflict between a first component carrier and a second component carrier having a same priority; and
select one of the first component carrier and the second component carrier based on an order of the plurality of component carriers.

8. The first network node of claim 1, wherein the first network node is further configured to:
include the component carriers with at least one failed code block group in the subset of the plurality of component carriers based on the order, wherein the feedback information is based on the inclusion.

9. The first network node of claim 1, wherein the feedback protocol defines a threshold number of failed code block groups, and wherein the first network node is further configured to:
identify those component carriers that have at least the threshold number of failed code block groups; and
include the component carriers that have at least the threshold number of failed code block groups in the subset of the plurality of component carriers, wherein the feedback information is based on the inclusion.

10. The first network node of claim 9, wherein, to include the component carriers that have at least the threshold number of failed code block groups in the subset of the plurality of component carriers, the first network node is further configured to:
prioritize the component carriers with higher numbers of failed code block groups in the subset of the plurality of component carriers.

11. The first network node of claim 9, wherein the threshold number of failed code block groups comprises a ratio of failed code block groups in each component carrier to a total number of code block groups in that component carrier.

12. The first network node of claim 9, wherein the threshold number of failed code block groups comprises a percentage of failed code block groups in each component carrier.

13. The first network node of claim 1, wherein the first network node is further configured to:
encode additional feedback information for two or more component carriers into joint feedback information, wherein the feedback information is further based on the joint feedback information.

14. The first network node of claim 13, wherein the two or more component carriers are not included in the subset of the plurality of component carriers.

15. The first network node of claim 13, wherein the first network node is further configured to:
determine that a size of the feedback information is less than a total size for the feedback message, wherein the additional feedback information is encoded based on the determination that the size of the feedback information is less than the total size.

16. The first network node of claim 13, wherein, to encode the additional feedback information, the first network node is further configured to:
apply a coding table to the additional feedback information to encode the joint feedback information.

17. A method of wireless communication performed by a first network node, comprising:
receiving a data transmission for each of a plurality of component carriers over a wireless channel from a second network node, wherein each data transmission is associated with a number of code block groups;
receiving an indication of a feedback protocol from the second network node, wherein the feedback protocol applies to the plurality of component carriers and defines an order of priority of the plurality of component carriers;
determining a maximum quantity of component carriers for which to report feedback information;
identifying component carriers that have a failed code block group from the plurality of component carriers;
selecting a subset of the plurality of component carriers for which to report feedback information for the number of code block groups based on the feedback protocol, wherein the subset of the plurality of component carriers includes highest priority component carriers with at least one failed code block group up to the maximum quantity of component carriers;

generating the feedback information based on the subset of the plurality of component carriers and the feedback protocol; and transmitting a feedback message that indicates the feedback information for the subset of the plurality of component carriers to the second network node.

18. The method of claim 17, further comprising:

determining a reception status for each code block group of each data transmission for each of the plurality of component carriers, wherein the feedback information is based on the reception status.

19. The method of claim 17, wherein the indication of the feedback protocol is included in one of a radio resource control signal, a media access control (MAC) control element, or a downlink control information message.

20. The method of claim 17, wherein the feedback information comprises one or more of a channel quality index, a modulation and coding scheme, or a downlink control information miss detection.

21. The method of claim 17, wherein identifying the feedback protocol further comprises:

determining a maximum number of bits for the feedback information, wherein generating the feedback information is based on the maximum number of bits.

22. The method of claim 17, further comprising:

determining a conflict between a first component carrier and a second component carrier having a same priority; and selecting one of the first component carrier and the second component carrier based on an order of the plurality of component carriers.

23. The method of claim 17, wherein including the component carriers with the at least one failed code block group in the subset of the plurality of component carriers is further based on the order, wherein generating the feedback information is based on the inclusion.

24. A method of wireless communication performed by a first network node, comprising:

transmitting an indication of feedback protocol to a second network node, wherein the feedback protocol is for feedback information determination, applies to a plurality of component carriers, and defines an order of priority of the plurality of component carriers;

transmitting a data transmission for each of the plurality of component carriers over a wireless channel to the second network node, wherein each data transmission is associated with a number of code block groups; and receiving a feedback message that indicates feedback information for a subset of the plurality of component carriers of the wireless channel according to the feedback protocol from the second network node, wherein the subset of the plurality of component carriers includes highest priority component carriers with at least one failed code block group up to a maximum quantity of component carriers.

25. A first network node for wireless communication, comprising:

at least one memory; and at least one processor coupled with the at least one memory, wherein the at least one processor is configured to:

transmit an indication of feedback protocol to a second network node, wherein the feedback protocol is for feedback information determination, applies to a plurality of component carriers, and defines an order of priority of the plurality of component carriers;

transmit a data transmission for each of the plurality of component carriers over a wireless channel to the second network node, wherein each data transmission is associated with a number of code block groups; and receive a feedback message that indicates feedback information for a subset of the plurality of component carriers of the wireless channel according to the feedback protocol from the second network node, wherein the subset of the plurality of component carriers includes highest priority component carriers with at least one failed code block group up to a maximum quantity of component carriers.

* * * * *